(12) United States Patent
Aiba et al.

(10) Patent No.: US 11,139,926 B2
(45) Date of Patent: Oct. 5, 2021

(54) USER EQUIPMENTS, BASE STATIONS AND METHODS FOR PHYSICAL DOWNLINK CONTROL CHANNEL MONITORING IN DOWNLINK

(71) Applicants: Sharp Laboratories of America, Inc., Vancouver, WA (US); FG Innovation Company Limited, Tuen Mun (HK)

(72) Inventors: Tatsushi Aiba, Vancouver, WA (US); Kai Ying, Vancouver, WA (US); John Michael Kowalski, Vancouver, WA (US)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 210 days.

(21) Appl. No.: 16/407,852

(22) Filed: May 9, 2019

(65) Prior Publication Data

US 2019/0349142 A1   Nov. 14, 2019

Related U.S. Application Data

(63) Continuation of application No. PCT/US2019/031302, filed on May 8, 2019.
(Continued)

(51) Int. Cl.
*H04L 1/18* (2006.01)
*H04W 72/04* (2009.01)
(Continued)

(52) U.S. Cl.
CPC .......... *H04L 1/1819* (2013.01); *H04L 5/0055* (2013.01); *H04W 24/08* (2013.01);
(Continued)

(58) Field of Classification Search
USPC ........................................................ 370/329
See application file for complete search history.

(56) References Cited

U.S. PATENT DOCUMENTS

2010/0128614 A1   5/2010   Kuusela et al.
2011/0228863 A1   9/2011   Papasakellariou et al.
(Continued)

FOREIGN PATENT DOCUMENTS

WO   2017026324 A1   2/2017

OTHER PUBLICATIONS

3GPP TS 38.211 V15.1.0, 3rd Generation Partnership Project; Technical Specification Group Radio Access Network; NR; Physical channels and modulation (Release 15), Mar. 2018.
(Continued)

*Primary Examiner* — Gregory B Sefcheck
*Assistant Examiner* — Majid Esmaeilian
(74) *Attorney, Agent, or Firm* — Imperium Patent Works

(57) ABSTRACT

A user equipment (UE) is described. The UE includes receiving circuitry configured to receive a radio resource control (RRC) signal including information used for configuring the UE to monitor physical downlink control channel (PDCCH) candidates either for a downlink control information (DCI) format 0_1 and a DCI format 1_1 or a first DCI format and a second DCI format. The UE also includes transmitting circuitry configured to perform a transmission on a physical uplink shared channel (PUSCH). In a case that the PUSCH is scheduled by using the second DCI format, a first hybrid automatic repeat request-acknowledgment (HARQ-ACK) and a second HARQ-ACK are multiplexed on the PUSCH. The number of resources for the first HARQ-ACK and the number of resources for the second HARQ-ACK are respectively determined.

3 Claims, 16 Drawing Sheets

Related U.S. Application Data

(60) Provisional application No. 62/669,922, filed on May 10, 2018.

(51) Int. Cl.
| | | |
|---|---|---|
| *H04W 76/27* | (2018.01) | |
| *H04W 24/08* | (2009.01) | |
| *H04L 5/00* | (2006.01) | |
| *H04W 80/02* | (2009.01) | |
| *H04W 76/11* | (2018.01) | |

(52) U.S. Cl.
CPC .......... *H04W 72/042* (2013.01); *H04W 76/11* (2018.02); *H04W 76/27* (2018.02); *H04W 80/02* (2013.01)

(56) References Cited

U.S. PATENT DOCUMENTS

| | | | |
|---|---|---|---|
| 2011/0305211 A1 | 12/2011 | Lunttila et al. | |
| 2013/0034073 A1 | 2/2013 | Aiba et al. | |
| 2013/0301490 A1* | 11/2013 | He | H04W 52/0209 370/280 |
| 2015/0358924 A1* | 12/2015 | Papasakellariou | H04W 72/0406 370/329 |
| 2016/0182213 A1* | 6/2016 | Golitschek Edler von Elbwart | H04L 5/22 370/294 |
| 2016/0249338 A1 | 8/2016 | Hwang et al. | |
| 2016/0295561 A1* | 10/2016 | Papasakellariou | H04L 5/0055 |
| 2017/0332374 A1 | 11/2017 | Koorapaty et al. | |
| 2017/0359815 A1* | 12/2017 | Chendamarai Kannan | H04L 1/1854 |
| 2018/0167932 A1* | 6/2018 | Papasakellariou | H04L 1/1861 |
| 2019/0182807 A1* | 6/2019 | Panteleev | H04L 1/0068 |
| 2019/0372723 A1* | 12/2019 | Xiong | H04L 1/18 |

OTHER PUBLICATIONS

3GPP TS 36.212 V15.1.0, 3rd Generation Partnership Project; Technical Specification Group Radio Access Network; Evolved Universal Terrestrial Radio Access (E-UTRA); Multiplexing and channel coding (Release 15), Mar. 2018.

3GPP TS 36.213 V15.1.0, 3rd Generation Partnership Project; Technical Specification Group Radio Access Network; Evolved Universal Terrestrial Radio Access (E-UTRA); Physical Layer Procedures (Release 15), Mar. 2018.

3GPP TS 36.214 V15.1.0, 3rd Generation Partnership Project; Technical Specification Group Radio Access Network; Evolved Universal Terrestrial Radio Access (E-UTRA); Physical layer Measurements (Release 15) Mar. 2018.

International Search Report and Written Opinion issued for PCT Application No. PCT/US2019/031302 dated Aug. 2, 2019.

* cited by examiner

Supported Transmission Numerologies 201

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot 203

| | | Slot configuration | | | |
|---|---|---|---|---|---|
| | | 0 | | | 1 |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

| $I_{offset,0}^{HARQ-ACK}$ | $\beta_{offset}^{HARQ-ACK}$ |
|---|---|
| 0 | 1.000 |
| 1 | 2.000 |
| 2 | 2.500 |
| 3 | 3.125 |
| 4 | 4.000 |
| 5 | 5.000 |
| ... | ... |
| 19 | 50.000 |
| 20 | 80.000 |
| ... | ... |
| 28 | 196.000 |
| 29 | 210.000 |
| 30 | 228.000 |
| 31 | Reserved |

(a) Mapping of offset value(s) for HARQ-ACK
601

| $I_{offset,0}^{CSI}$ | $\beta_{offset}^{CSI}$ |
|---|---|
| 0 | 1.125 |
| 1 | 1.250 |
| 2 | 1.375 |
| 3 | 1.625 |
| 4 | 1.750 |
| 5 | 2.000 |
| ... | ... |
| 19 | 10.000 |
| 20 | 12.625 |
| ... | ... |
| 28 | 32.000 |
| 29 | 36.000 |
| 30 | 48.000 |
| 31 | Reserved |

(b) Mapping of offset value(s) for CSI
603

FIG. 6

| $I^{HARQ-ACK}_{offset,0}$ | $\beta^{HARQ-ACK}_{offset}$ |
|---|---|
| 0 | 1.000 |
| 1 | 2.000 |
| 2 | 2.500 |
| 3 | 3.125 |
| 4 | 4.000 |
| 5 | 5.000 |
| ... | ... |
| 9 | 20.000 |
| 10 | 26.000 |
| ... | ... |
| 12 | 50.000 |
| 13 | 68.000 |
| 14 | 80.000 |
| 15 | Reserved |

Table-1 for HARQ-ACK

| $I^{HARQ-ACK}_{offset,0}$ | $\beta^{HARQ-ACK}_{offset}$ |
|---|---|
| 0 | 42.000 |
| 1 | 48.000 |
| 2 | 54.000 |
| 3 | 68.125 |
| 4 | 80.000 |
| 5 | 92.000 |
| ... | ... |
| 9 | 106.000 |
| 10 | 140.000 |
| ... | ... |
| 12 | 196.000 |
| 13 | 210.000 |
| 14 | 228.000 |
| 15 | Reserved |

Table-2 for HARQ-ACK (a) Mapping of offset value(s) for HARQ-ACK
701

| $I^{CSI}_{offset,0}$ | $\beta^{CSI}_{offset}$ |
|---|---|
| 0 | 1.125 |
| 1 | 1.250 |
| 2 | 1.375 |
| 3 | 1.625 |
| 4 | 1.750 |
| 5 | 2.000 |
| ... | ... |
| 9 | 7.000 |
| 10 | 8.625 |
| ... | ... |
| 12 | 12.000 |
| 13 | 14.000 |
| 14 | 18.000 |
| 15 | Reserved |

Table-1 for CSI

| $I^{CSI}_{offset,0}$ | $\beta^{CSI}_{offset}$ |
|---|---|
| 0 | 12.125 |
| 1 | 18.250 |
| 2 | 21.375 |
| 3 | 32.625 |
| 4 | 46.750 |
| 5 | 50.000 |
| ... | ... |
| 9 | 72.000 |
| 10 | 74.625 |
| ... | ... |
| 12 | 80.000 |
| 13 | 84.000 |
| 14 | 96.000 |
| 15 | Reserved |

Table-2 for CSI (b) Mapping of offset value(s) for CSI
703

FIG. 7

USER EQUIPMENTS, BASE STATIONS AND METHODS FOR PHYSICAL DOWNLINK CONTROL CHANNEL MONITORING IN DOWNLINK

RELATED APPLICATIONS

This application is related to and claims priority from U.S. Provisional Patent Application No. 62/669,922, entitled "USER EQUIPMENTS, BASE STATIONS AND METHODS FOR PHYSICAL DOWNLINK CONTROL CHANNEL MONITORING IN DOWNLINK," filed on May 10, 2018, which is hereby incorporated by reference herein, in its entirety.

TECHNICAL FIELD

The present disclosure relates generally to communication systems. More specifically, the present disclosure relates to new signaling, procedures, user equipment (UE) and base stations for uplink control information (UCI) multiplexing in uplink and/or for physical downlink control channel (PDCCH) monitoring in downlink.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 shows examples of multiple numerologies;

FIG. 6 illustrates an example of offset values;

FIG. 7 illustrates another example of offset values;

DETAILED DESCRIPTION

Figure 1:
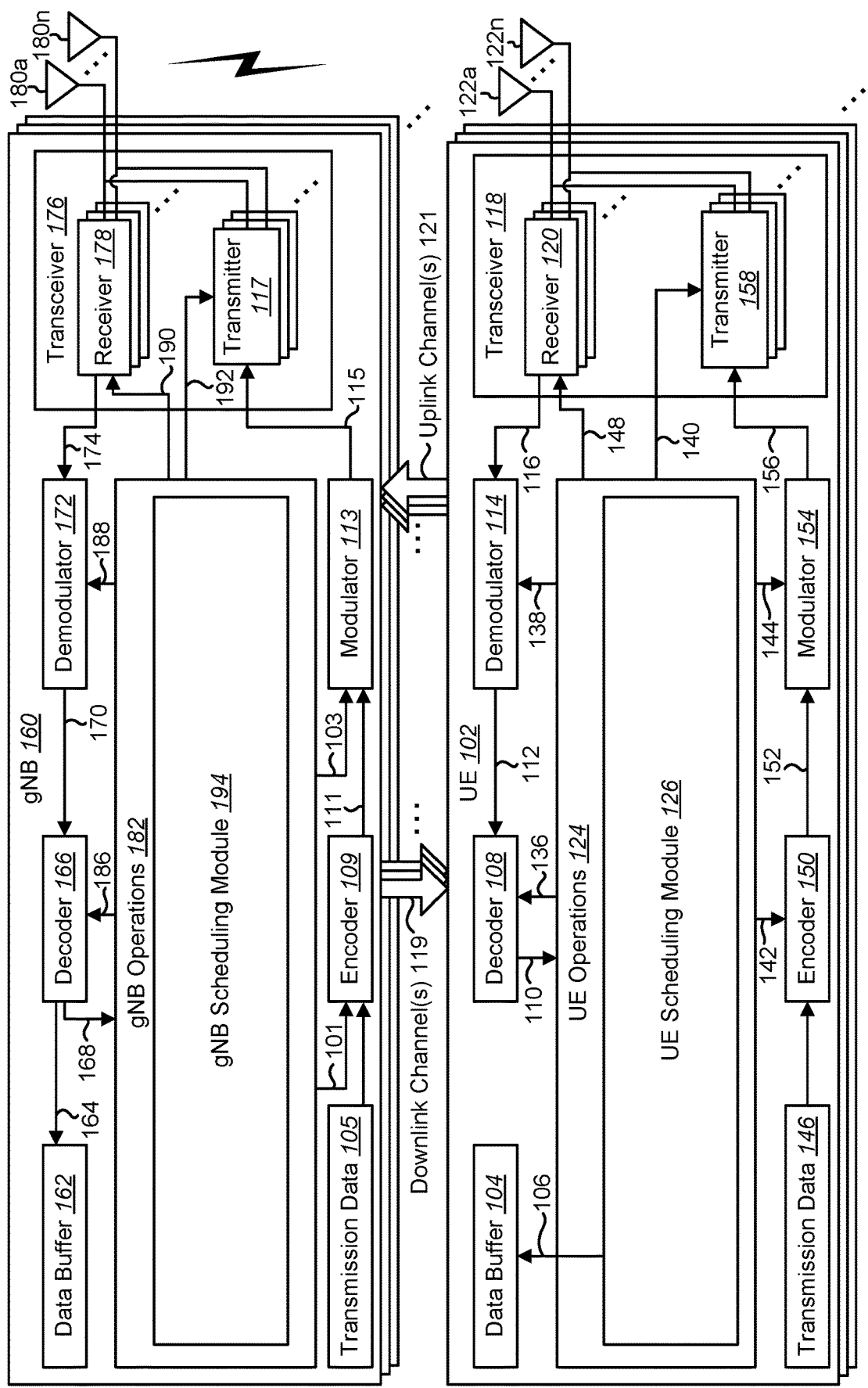
FIG. 1 is a block diagram illustrating one implementation of one or more base station apparatuses (gNBs) and one or more user equipments (UEs) in which systems and methods for signaling may be implemented.

An example of a user equipment (UE) is described herein. The UE includes receiving circuitry configured to receive a radio resource control (RRC) signal including information used for configuring the UE to monitor physical downlink control channel (PDCCH) candidates either for a downlink control information (DCI) format 0_1 and a DCI format 1_1 or a first DCI format and a second DCI format. The UE also includes transmitting circuitry configured to perform a transmission on a physical uplink shared channel (PUSCH). In a case that the PUSCH is scheduled by using the second DCI format, a first hybrid automatic repeat request-acknowledgment (HARQ-ACK) and a second HARQ-ACK are multiplexed on the PUSCH. The number of resources for the first HARQ-ACK and the number of resources for the second HARQ-ACK are respectively determined.

The DCI format 0_1 may be used for scheduling of a PUSCH. The DCI format 1_1 may be used for scheduling of a physical downlink shared channel (PDSCH). The first DCI format may be used for scheduling of a PDSCH.

A base station apparatus is also described. The base station apparatus includes transmitting circuitry configured to transmit an RRC signal including information used for configuring a UE to monitor PDCCH candidates either for a DCI format 0_1 and a DCI format 1_1 or a first DCI format and a second DCI format. The base station apparatus also includes receiving circuitry configured to perform a reception of a PUSCH. In a case that the PUSCH is scheduled by using the second DCI format, a first HARQ-ACK and a second HARQ-ACK are multiplexed on the PUSCH. The number of resources for the first HARQ-ACK and the number of resources for the second HARQ-ACK are respectively determined.

A communication method of a UE is also described. The method includes receiving a RRC signal including information used for configuring the UE to monitor PDCCH candidates either for a DCI format 0_1 and a DCI format 1_1 or a first DCI format and a second DCI format. The method also includes performing a transmission on a PUSCH. In a case that the PUSCH is scheduled by using the second DCI format, a first HARQ-ACK and a second HARQ-ACK are multiplexed on the PUSCH. The number of resources for the first HARQ-ACK and the number of resources for the second HARQ-ACK are respectively determined.

A communication method of a base station apparatus is also described. The method includes transmitting an RRC signal including information used for configuring a UE to monitor PDCCH candidates either for a DCI format 0_1 and a DCI format 1_1 or a first DCI format and a second DCI format. The method also includes performing a reception of a PUSCH. In a case that the PUSCH is scheduled by using the second DCI format, a first HARQ-ACK and a second HARQ-ACK are multiplexed on the PUSCH. The number of resources for the first HARQ-ACK and the number of resources for the second HARQ-ACK are respectively determined.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and eMTC (massive Machine Type Communication) transmission. And, in NR, transmissions for different services may be specified (e.g., configured) for one or more bandwidth parts (BWPs) in a serving cell and/or for one or more serving cells. A user equipment (UE) may receive a downlink signal(s) and/or an uplink signal(s) in the BWP(s) of the serving cell and/or the serving cell(s).

In order for the services to use the time, frequency, and/or space resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for signaling may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 include a physical shared channel (e.g., PDSCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink physical shared channel (PSCH) (e.g., PUSCH) resource).

In another example, a PCCH (Physical Control Channel) may be defined. The PCCH may be used to transmit control information. In uplink, PCCH (e.g., Physical Uplink Control Channel (PUCCH)) is used for transmitting uplink control information (UCI). The UCI may include hybrid automatic repeat request (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s)). Here, the CSI reporting may be periodic and/or aperiodic. Also, the SR is used for requesting resources of uplink data (e.g., Transport block(s), MAC PDU and/or Uplink Shared Channel (UL-SCH)).

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. For example, control, management, and/or process of HARQ may be performed, in the MAC layer, per the transport block. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In downlink, the PCCH (e.g., physical downlink control channel (PDCCH)) may be used for transmitting downlink control information (DCI). Here, more than one DCI format may be defined (e.g., configured) for DCI transmission on the PCCH. Namely, fields may be defined in the DCI format, and the fields are mapped to the information bits (e.g., DCI bits).

For example, the DCI format 1_0 that is used for scheduling of the PDSCH in the cell may be defined as the DCI format for the downlink. Here, the DCI format 1_0 described herein may be assumed to be included in a DCI format A in some implementations for the sake of simplifying description. Also, as described herein one or more Radio Network Temporary Identifiers (e.g., the Cell RNTI (C-RNTI), the Configured Scheduling RNTI (CS-RNTI), the first RNTI, the Paging RNTI (P-RNTI), the System Information RNTI (SI-RNTI), and/or the Random Access RNTI (RA-RNTI)) may be used to transmit the DCI format A. Also, the DCI format A may be monitored (e.g., transmitted, mapped) in the Common Search Space (CSS) and/or the UE Search Space (USS). Alternatively, the DCI format A may be monitored (e.g., transmitted, mapped) in the CSS only.

For example, the DCI format A may be used for transmitting downlink control information (e.g., DCI). For example, the DCI included in the DCI format A may be an identifier for the DCI format(s). Additionally or alternatively, the DCI included in the DCI format A may be a frequency domain resource assignment (e.g., for the PDSCH). Additionally or alternatively, the DCI included in the DCI format A may be a time domain resource assignment (e.g., for the PDSCH). Additionally or alternatively, the DCI included in the DCI format A may be a modulation and coding scheme (e.g., for the PDSCH). Additionally or alternatively, the DCI included in the DCI format A may be a new data indicator. Additionally or alternatively, the DCI included in the DCI format A may be HARQ process number. Additionally or alternatively, the DCI included in the DCI format A may be a downlink assignment index. Additionally or alternatively, the DCI included in the DCI format A may be a TPC (e.g., Transmission Power Control) command for scheduled PUCCH. Additionally or alternatively, the DCI included in the DCI format A may be a PUCCH resource indicator. Additionally or alternatively, the DCI included in the DCI format A may be a timing indicator (e.g., a timing indicator for HARQ transmission for the PDSCH reception). Additionally or alternatively, as described below, the DCI included in the DCI format A may be information used for indicating an offset value(s) for the HARQ-ACK(s). Additionally or alternatively, as described herein, the DCI included in the DCI format A may be information used for indicating an offset value(s) for the CSI(s).

Additionally or alternatively, the DCI format 1_1 that is used for scheduling of the PDSCH in the cell may be defined as the DCI format for the downlink. Here, the DCI format 1_1 described herein may be assumed to be included in a DCI format B in some implementations for the sake of simplifying description. Additionally or alternatively, the C-RNTI, the CS-RNTI, and/or the first RNTI may be used to transmit the DCI format B. Additionally or alternatively, the DCI format B may be monitored (e.g., transmitted and/or mapped) in the CSS and/or the USS.

For example, the DCI format B may be used for transmitting downlink control information (e.g., DCI). For example, the DCI included in the DCI format B may be a carrier indicator. Additionally or alternatively, the DCI included in the DCI format B may be an identifier for the DCI format(s). Additionally or alternatively, the DCI included in the DCI format B may be a BWP indicator (e.g., for the PDSCH). Additionally or alternatively, the DCI included in the DCI format B may be frequency domain resource assignment (e.g., for the PDSCH). Additionally or alternatively, the DCI included in the DCI format B may be a time domain resource assignment (e.g., for the PDSCH). Additionally or alternatively, the DCI included in the DCI format B may be a modulation and coding scheme (e.g., for the PDSCH). Additionally or alternatively, the DCI included in the DCI format B may be a new data indicator. Additionally or alternatively, the DCI included in the DCI format B may be a HARQ process number. Additionally or alternatively, the DCI included in the DCI format B may be a downlink assignment index. Additionally or alternatively, the DCI included in the DCI format B may be a TPC command for scheduled PUCCH. Additionally or alternatively, the DCI included in the DCI format B may be a PUCCH resource indicator. Additionally or alternatively, the DCI included in the DCI format B may be a timing indicator (e.g., a timing indicator for HARQ transmission for the PDSCH reception). Additionally or alternatively, the DCI included in the DCI format B may be a SRS request that is used for requesting (e.g., triggering) transmission of the SRS. Additionally or alternatively, the DCI included in the DCI format B may be a CBG (e.g., code block group) transmission information (e.g., for the PDSCH). Additionally or alternatively, the DCI included in the DCI format B may be CBF flushing out information (e.g., for the PDSCH). Additionally or alternatively, the DCI included in the DCI format B may be a CSI request that is used for requesting (e.g., triggering) transmission of the CSI. Additionally or alternatively, as described herein, the DCI included in the DCI format B may be information used for indicating an offset value(s) for the HARQ-ACK(s). Additionally or alternatively, as described herein, the DCI included in the DCI format B may be information used for indicating an offset value(s) for the CSI(s).

Additionally or alternatively, the DCI format 0_0 that is used for scheduling of the PUSCH in the cell may be defined as the DCI format for the uplink. Here, the DCI format 0_0 described herein may be assumed to be included in a DCI format C in some implementations for the sake of simplifying description. Additionally or alternatively, the C-RNTI, the CS-RNTI, the first RNTI, and/or the Temporary C-RNTI may be used to transmit the DCI format C. Additionally or alternatively, the DCI format C may be monitored (e.g., transmitted, mapped) in the CSS and/or the USS. Alternatively, the DCI format C may be monitored (e.g., transmitted, mapped) in the CSS only.

For example, the DCI format C may be used for transmitting downlink control information (e.g., DCI). For example, the DCI included in the DCI format C may be an identifier for the DCI format(s). Additionally or alternatively, the DCI included in the DCI format C may be a frequency domain resource assignment (e.g., for the PUSCH). Additionally or alternatively, the DCI included in the DCI format C may be a time domain resource assignment (e.g., for the PUSCH). Additionally or alternatively, the DCI included in the DCI format C may be a modulation and coding scheme (e.g., for the PUSCH). Additionally or alternatively, the DCI included in the DCI format C may be a new data indicator. Additionally or alternatively, the DCI included in the DCI format C may be a HARQ process number. Additionally or alternatively, the DCI included in the DCI format C may be a redundancy version. Additionally or alternatively, the DCI included in the DCI format C may be a TPC command for scheduled PUSCH.

Additionally or alternatively, the DCI included in the DCI format C may be a UL/SUL (e.g., Supplemental Uplink) indicator. Additionally or alternatively, as described herein, the DCI included in the DCI format C may be information used for indicating an offset value(s) for the HARQ-ACK(s). Additionally or alternatively, as described herein, the DCI included in the DCI format C may be information used for indicating an offset value(s) for the CSI(s).

Additionally or alternatively, a DCI format 0_1 that is used for scheduling of the PUSCH in the cell may be defined as the DCI format for the uplink. Here, the DCI format 0_1 described herein may be assumed to be included in a DCI format D in some implementations for the sake of simplifying description. Additionally or alternatively, the C-RNTI, the CS-RNTI, and/or the first RNTI may be used to transmit the DCI format D. Additionally or alternatively, the DCI format D may be monitored (e.g., transmitted, mapped) in the CSS and/or the USS.

For example, the DCI format D (e.g., the DCI format D with the cyclic redundancy check (CRC) scrambled by the C-RNTI) may be used for transmitting downlink control information (e.g., DCI). For example, the DCI included in the DCI format D may be a carrier indicator. Additionally or alternatively, the DCI included in the DCI format D may be a UL/SUL indicator. Additionally or alternatively, the DCI included in the DCI format D may be an identifier for the DCI format(s). Additionally or alternatively, the DCI included in the DCI format D may be a BWP indicator (e.g., for the PUSCH). Additionally or alternatively, the DCI included in the DCI format D may be a frequency domain resource assignment (e.g., for the PUSCH). Additionally or alternatively, the DCI included in the DCI format D may be a time domain resource assignment (e.g., for the PUSCH). Additionally or alternatively, the DCI included in the DCI format D may be a modulation and coding scheme (e.g., for the PUSCH).

Additionally or alternatively, the DCI included in the DCI format D may be a new data indicator. Additionally or alternatively, the DCI included in the DCI format D may be a HARQ process number. Additionally or alternatively, the DCI included in the DCI format D may be a downlink assignment index. Additionally or alternatively, the DCI included in the DCI format D may be a TPC command for scheduled PUSCH. Additionally or alternatively, the DCI included in the DCI format D may be a PUCCH resource indicator. Additionally or alternatively, the DCI included in the DCI format D may be a SRS request that is used for requesting (e.g., triggering) transmission of the SRS. Additionally or alternatively, the DCI included in the DCI format D may be CBG (e.g., code block group) transmission information. Additionally or alternatively, the DCI included in the DCI format D may be CBF flushing out information. Additionally or alternatively, the DCI included in the DCI format D may be a CSI request that is used for requesting (e.g., triggering) transmission of the CSI. Additionally or alternatively, as described herein, the DCI included in the DCI format D may be information used for indicating an offset value(s) for the HARQ-ACK(s). Additionally or alternatively, as described herein, the DCI included in the DCI format D may be information used for indicating an offset value(s) for the CSI(s).

Additionally or alternatively, the DCI format E that is used for scheduling of the PDSCH in the cell may be defined as the DCI format for the downlink. Here, the DCI format E described herein may be assumed to be included in the compact DCI format(s) for the downlink in some implementations for the sake of simplifying description. Additionally or alternatively, as described herein, the C-RNTI, the CS-RNTI, the first RNTI, the P-RNTI, the SI-RNTI, and/or the RA-RNTI may be used to transmit the DCI format E. Additionally or alternatively, the DCI format E may be monitored (e.g., transmitted, mapped) in the CSS and/or the USS. Alternatively, the DCI format E may be monitored (e.g., transmitted, mapped) in the CSS only. Alternatively, the DCI format E may be monitored (e.g., transmitted, mapped) in the CSS only.

For example, the DCI format E may be used for transmitting downlink control information (e.g., DCI). For example, the DCI included in the DCI format E may be an identifier for the DCI format(s) (e.g., the DCI format E). Additionally or alternatively, the DCI included in the DCI format E may be a frequency domain resource assignment (e.g., for the PDSCH). Additionally or alternatively, the DCI included in the DCI format E may be a time domain resource assignment (e.g., for the PDSCH). Additionally or alternatively, the DCI included in the DCI format E may be a modulation and coding scheme (e.g., for the PDSCH). Additionally or alternatively, the DCI included in the DCI format E may be a new data indicator. Additionally or alternatively, the DCI included in the DCI format E may be HARQ process number. Additionally or alternatively, the DCI included in the DCI format E may be a downlink assignment index. Additionally or alternatively, the DCI included in the DCI format E may be a TPC (e.g., Transmission Power Control) command for scheduled PUCCH. Additionally or alternatively, the DCI included in the DCI format E may be a PUCCH resource indicator. Additionally or alternatively, the DCI included in the DCI format E may be a timing indicator (e.g., a timing indicator for HARQ transmission for the PDSCH reception). Additionally or alternatively, as described herein, the DCI included in the DCI format E may be information used for indicating an offset value(s) for the HARQ-ACK(s). Additionally or alternatively, as described herein, the DCI included in the DCI format E may be information used for indicating an offset value(s) for the CSI(s).

Here, the number of bits for the DCI format E (e.g., the size of the DCI format E) may be smaller than the DCI format A (e.g., and/or the DCI format B). Additionally or alternatively, the number of bits for the DCI format A (e.g., the size of the DCI format A) may be smaller than the DCI format B. For example, the DCI format E may not include one or more information fields included in the DCI format A (and/or the DCI format B). For instance, the DCI format E may not include an identifier for the DCI format(s) (e.g., the DCI format E). Additionally or alternatively, the DCI format E may not include a frequency domain resource assignment (e.g., for the PDSCH). Additionally or alternatively, the DCI format E may not include a time domain resource assignment (e.g., for the PDSCH). Additionally or alternatively, the DCI format E may not include a modulation and coding scheme (e.g., for the PDSCH). Additionally or alternatively, the DCI format E may not include a new data indicator. Additionally or alternatively, the DCI format E may not include HARQ process number. Additionally or alternatively, the DCI format E may not include a downlink assignment index. Additionally or alternatively, the DCI format E may not include a TPC (e.g., Transmission Power Control) command for scheduled PUCCH. Additionally or alternatively, the DCI format E may not include a PUCCH resource indicator. Additionally or alternatively, the DCI format E may not include a timing indicator (e.g., a timing indicator for HARQ transmission for the PDSCH reception).

Additionally or alternatively, the DCI format F that is used for scheduling of the PUSCH in the cell may be defined as the DCI format for the uplink. Here, the DCI format F described herein may be assumed to be included in the compact DCI format for the uplink in some implementations for the sake of simplifying description. Additionally or alternatively, the C-RNTI, the CS-RNTI, the first RNTI, and/or the Temporary C-RNTI may be used to transmit the DCI format F. Additionally or alternatively, the DCI format F may be monitored (e.g., transmitted, mapped) in the CSS and/or the USS. Alternatively, the DCI format F may be monitored (e.g., transmitted, mapped) in the CSS only. Alternatively, the DCI format F may be monitored (e.g., transmitted, mapped) in the USS only.

For example, the DCI format F may be used for transmitting downlink control information (e.g., DCI). For example, the DCI included in the DCI format F may be an identifier for the DCI format(s) (e.g., the DCI format F). Additionally or alternatively, the DCI included in the DCI format F may be a frequency domain resource assignment (e.g., for the PUSCH). Additionally or alternatively, the DCI included in the DCI format F may be a time domain resource assignment (e.g., for the PUSCH). Additionally or alternatively, the DCI included in the DCI format F may be a modulation and coding scheme (e.g., for the PUSCH). Additionally or alternatively, the DCI included in the DCI format F may be a new data indicator. Additionally or alternatively, the DCI included in the DCI format F may be a HARQ process number. Additionally or alternatively, the DCI included in the DCI format F may be a redundancy version. Additionally or alternatively, the DCI included in the DCI format F may be a TPC command for scheduled PUSCH. Additionally or alternatively, the DCI included in the DCI format F may be a UL/SUL (e.g., Supplemental Uplink) indicator. Additionally or alternatively, as described herein, the DCI included in the DCI format F may be information used for indicating an offset value(s) for the HARQ-ACK(s). Additionally or alternatively, as described herein, the DCI included in the DCI format F may be information used for indicating an offset value(s) for the CSI(s).

Here, the number of bits for the DCI format F (e.g., the size of the DCI format F) may be smaller than the DCI format C (e.g., and/or the DCI format D). Additionally or alternatively, the number of bits for the DCI format C (e.g., the size of the DCI format C) may be smaller than the DCI format D. For example, the DCI format F may not include an identifier for the DCI format(s) (e.g., the DCI format F). Additionally or alternatively, the DCI format F may not include a frequency domain resource assignment (e.g., for the PUSCH). Additionally or alternatively, the DCI format F may not include a time domain resource assignment (e.g., for the PUSCH). Additionally or alternatively, the DCI format F may not include a modulation and coding scheme (e.g., for the PUSCH). Additionally or alternatively, the DCI format F may not include a new data indicator. Additionally or alternatively, the DCI format F may not include a HARQ process number. Additionally or alternatively, the DCI format F may not include a redundancy version. Additionally or alternatively, the DCI format F may not include a TPC command for scheduled PUSCH. Additionally or alternatively, the DCI format F may not include a UL/SUL (e.g., Supplemental Uplink) indicator.

Additionally or alternatively, in a case that the DCI format A is received (e.g., based on the detection of the DCI format A), the UE 102 may receive (e.g., decode, detect) the scheduled PDSCH. Additionally or alternatively, in a case that the DCI format B is received (e.g., based on the detection of the DCI format B), the UE 102 may receive (e.g., decode, detect) the scheduled PDSCH. Additionally or alternatively, in a case that the DCI format E is received (e.g., based on the detection of the DCI format E), the UE 102 may receive (e.g., decode, detect) the scheduled PDSCH.

Additionally or alternatively, in a case that the DCI format C is received (e.g., based on the detection of the DCI format C), the UE 102 may perform the PUSCH transmission. Additionally or alternatively, in a case that the DCI format D is received (e.g., based on the detection of the DCI format D), the UE 102 may perform the PUSCH transmission. Additionally or alternatively, in a case that the DCI format F is received (e.g., based on the detection of the DCI format F), the UE 102 may perform the PUSCH transmission.

Here, a RNTI(s) (e.g., a Radio Network Temporary Identifier(s)) assigned (e.g., by the gNB 160) to the UE 102 may be used for transmission of DCI (e.g., the DCI format(s), DL control channel(s) (e.g., the PDCCH(s)). For example, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. For example, the UE 102 detects DL control channel (e.g., the PDCCH, the DCI, the DCI format(s)) based on the blind decoding. That is, the UE 102 may decode the DL control channel(s) with the CRC scrambled by the RNTI(s). In other words, the UE 102 may monitor the DL control channel(s) with the RNTI(s). Additionally or alternatively, as described herein, the UE 102 may detect the DCI format(s) in a USS (e.g., the control channel resource set (CORESET) of a USS (e.g., a UE-specific search space)) and/or a CSS (e.g., the CORESET of a CSS (e.g., a common search space, a UE-common search space)). For example, the UE 102 may detect the DCI format(s) with the RNTI(s).

Here, the RNTI(s) may include C-RNTI(s) (Cell-RNTI(s)), SPS C-RNTI(s) (Semi-Persistent Scheduling C-RNTI(s)), CS-RNTI(s) (Configured Scheduling C-RNTI(s)), RNTI(s) (e.g., C-RNTI(s)) for the DCI format(s) E and/or the DCI format(s) F, SI-RNTI(s) (System Information RNTI(s)), P-RNTI(s) (Paging RNTI(s)), RA-RNTI(s) (Random Access-RNTI(s)), and/or Temporary C-RNTI(s). Here, the RNTI(s) (e.g., C-RNTI(s)) for the DCI format(s) E and/or the DCI format(s) F described herein may be assumed to be included in a first RNTI in some implementations for the sake of simplifying description. For example, the first RNTI may be defined for the DCI format(s) E and the DCI format(s) F.

For example, the C-RNTI(s) may be a unique identification used for identifying a RRC connection and/or scheduling. Additionally or alternatively, the SPS C-RNTI(s) may be a unique identification used for semi-persistent scheduling. Additionally or alternatively, the CS-RNTI(s) may be a unique identification used for scheduling of transmission based on a configured grant. Additionally or alternatively, the first RNTI(s) may be a unique identification used for identifying the DCI format(s) E and/or the DCI format(s) F. For example, the UE 102 may identify the DCI format(s) E and/or the DCI format(s) F based on a detection of the first RNTI(s). For example, if the UE 102 detects the first RNTI(s), the UE 102 may recognize the monitored DCI format(s) as the DCI format(s) E and/or the DCI format(s) F. Additionally or alternatively, the SI-RNTI may be used for identifying system information (SI) (e.g., an SI message) mapped on the BCCH and dynamically carried on DL-SCH. Additionally or alternatively, the SI-RNTI may be used for broadcasting of SI. Additionally or alternatively, the P-RNTI may be used for transmission of paging and/or SI change notification. Additionally or alternatively, the RA-RNTI may be an identification used for the random access procedure (e.g., Msg.2 transmission). Additionally or alternatively, the Temporary C-RNTI may be used for the random access procedure (e.g., scheduling of Msg.3 (re)transmission).

Additionally or alternatively, for example, PSCH may be defined. For example, in a case that the downlink PSCH resource (e.g., the PDSCH, the PDSCH resource) is scheduled by using the DCI format(s), the UE 102 may receive the downlink data, on the scheduled downlink PSCH resource (e.g., the PDSCH, the PDSCH resource). Additionally or alternatively, in a case that the uplink PSCH resource (e.g., the PUSCH, the PUSCH resource) is scheduled by using the DCI format(s), the UE 102 transmits the uplink data, on the scheduled uplink PSCH resource (e.g., the PUSCH, the PUSCH resource). For example, the downlink PSCH may be used to transmit the downlink data (e.g., DL-SCH(s), a downlink transport block(s)). Additionally or alternatively, the uplink PSCH may be used to transmit the uplink data (e.g., UL-SCH(s), an uplink transport block(s)).

Furthermore, the downlink PSCH (e.g., the PDSCH) and/or the uplink PSCH (e.g., the PUSCH) may be used to transmit information of a higher layer (e.g., a radio resource control (RRC)) layer, and/or a MAC layer). For example, the downlink PSCH (e.g., from the gNB 160 to the UE 102) and/or the uplink PSCH (e.g., from the UE 102 to the gNB 160) may be used to transmit a RRC message (a RRC signal). Additionally or alternatively, the downlink PSCH (e.g., from the gNB 160 to the UE 102) and/or the uplink PSCH (e.g., from the UE 102 to the gNB 160) may be used to transmit a MAC control element (a MAC CE). Here, the RRC message that is transmitted from the gNB 160 in downlink may be common to multiple UEs 102 (and/or multiple serving cells) within a cell (referred as a common RRC message). Additionally or alternatively, the RRC message that is transmitted from the gNB 160 may be dedicated to a certain UE 102 (and/or a serving cell (e.g., a serving cell-dedicated)) (referred as a dedicated RRC message). The RRC message and/or the MAC CE are also referred to as a higher layer signal. For example, the RRC message may include the master information block (MIB) (e.g., PBCH), the system information block (SIB) (e.g., the SIB type 2), and/or the dedicated RRC message. For instance, a configuration by using the RRC message may include a configuration by using the PBCH (e.g., the MIB), the PDSCH (e.g., the SIB type 2), and/or the dedicated RRC message.

In some approaches, the downlink PSCH (e.g., the PDSCH) may be used for transmitting (e.g., notifying, specifying, identifying, etc.) a random access response (e.g., a message 2 (Msg.2)). For example, the downlink PSCH (e.g., the PDSCH) for the random access response may be scheduled by using the downlink physical channel (PCH) (e.g., the PDCCH) with the RA-RNTI. For instance, the random access response grant included in the random access response may be used for scheduling of the uplink PSCH (e.g., the PUSCH, a message 3 (Msg.3) in the random access procedure (e.g., the contention based random access procedure)). The random access response grant may be delivered from the higher layer (e.g., the MAC layer) to the physical layer.

In some approaches, a PBCH (physical broadcast channel, (e.g., primary PBCH)) may be defined. For example, the PBCH may be used for broadcasting the MIB (master information block). For instance, the MIB may be used by multiple UEs 102 and may include system information transmitted on the BCH (broadcast channel). Additionally or alternatively, the MIB may include information (e.g., an information block) for configuring a secondary PBCH. Furthermore, the MIB may include information (e.g., an information block) for configuring the downlink PSCH (e.g., PDSCH). For example, the PBCH (e.g., MIB) may be used for carrying, at least, information indicating a SFN (system frame number).

Here, the system information may be divided into the MIB and a number of SIB(s) (system information block(s)). The MIB may include a limited number of most essential and/or most frequently transmitted information (e.g., parameter(s)) that are needed to acquire other information from the cell. For example, the PBCH (e.g., MIB) may include minimum system information. Additionally or alternatively, the SIB(s) may be carried in a system information message. For example, the SIB(s) may be transmitted on the secondary PBCH and/or the downlink PSCH (e.g., the PDSCH). The SIB(s) (e.g., System Information Block Type 2) may include remaining minimum system information (e.g., RMSI). For example, the SIB(s) (e.g., System Information Block Type 2) may contain radio resource configuration information that is common for multiple UEs 102.

In some approaches, in downlink, a SS (Synchronization Signal) may be defined. The SS may be used for acquiring time and/or frequency synchronization with a cell. Additionally or alternatively, the SS may be used for detecting a physical layer cell ID of the cell. Here, a cell search may a procedure by which the UE 102 acquires the time and/or frequency synchronization with the cell. Additionally or alternatively, the cell search may be a procedure by which the UE 102 detects the physical layer cell ID. The SS may include a PSS (Primary Synchronization Signal). Additionally or alternatively, the SS may include a SSS (Secondary Synchronization Signal). Here, an SS/PBCH block(s) may be defined (e.g., specified). For example, in the time domain, an SS/PBCH block may consist of 4 OFDM symbols, numbered in increasing order from 0 to 3 within the SS/PBCH block, where the PSS, the SSS and the PBCH, DM-RS associated with the PBCH are mapped to different symbols. For example, the SS/PBCH block may consist of the PSS, the SSS, the PBCH, and/or the DM-RS associated with the PBCH. Here, the PBCH may be used for carrying information identifying SF number (System Frame number), an OFDM symbol index, a slot index in a radio frame and/or a radio frame number. Here, the SS/PBCH block(s) described herein may be assumed to be included in a SS block(s) in some implementations for the sake of simplifying description.

In the radio communication for uplink, UL RS(s) may be used as uplink physical signal(s). The uplink physical signal may not be used to transmit information that is provided from the higher layer, but is used by a physical layer. For example, the UL RS(s) may include the demodulation reference signal(s), the UE-specific reference signal(s), the sounding reference signal(s) (the SRS(s)) and/or the beam-specific reference signal(s). The demodulation reference signal(s) (e.g., DM-RS) may include the demodulation reference signal(s) associated with transmission of the uplink physical channel (e.g., the PUSCH and/or the PUCCH).

Additionally or alternatively, the UE-specific reference signal(s) may include reference signal(s) associated with transmission of uplink physical channel (e.g., the PUSCH and/or the PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

Additionally or alternatively, in the radio communication for downlink, DL RS(s) may be used as downlink physical signal(s). The downlink physical signal may not be used to transmit information that is provided from the higher layer, but is used by a physical layer. For example, the DL RS(s) may include the cell-specific reference signal(s), the UE-specific reference signal(s), the demodulation reference signal(s), and/or the channel state information reference signal (s) (the CSI-RS(s)). The UE-specific reference signal may include the UE-specific reference signal(s) associated with transmission of the downlink physical channel (e.g., the PDSCH and/or the PDCCH). Additionally or alternatively, the demodulation reference signal(s) may include the demodulation reference signal(s) associated with transmission of the downlink physical channel (e.g., the PDSCH and/or the PDCCH). Additionally or alternatively, the CSI-RS may include Non-zero power Channel State Information-Reference signal(s) (NZP CSI-RS), and/or Zero power Channel State Information-Reference signal (ZP CSI-RS).

Here, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies 201. As shown in FIG. 2, multiple numerologies 201 (e.g., multiple subcarrier spacing) may be supported. For example, μ (e.g., a subcarrier space configuration) and a cyclic prefix (e.g., the μ and the cyclic prefix for a carrier bandwidth part) may be configured by higher layer parameters (e.g., a RRC message) for the downlink and/or the uplink. Here, 15 kHz may be a reference numerology 201. For example, an RE of the reference numerology 201 may be defined with a subcarrier spacing of 15 kHz in a frequency domain and 2048 Ts+CP length (e.g. 160 Ts or 144 Ts) in a time domain, where Ts denotes a baseband sampling time unit defined as 1/(15000*2048) seconds.

Additionally or alternatively, a number of OFDM symbol(s) 203 per slot ($N_{symb}^{slot}$) may be determined based on the μ (e.g., the subcarrier space configuration). Here, for example, a slot configuration 0 (e.g., the number of OFDM symbols 203 per slot may be 14) and/or a slot configuration (e.g., the number of OFDM symbols 203 per slot may be 7) may be defined.

Figure 3:
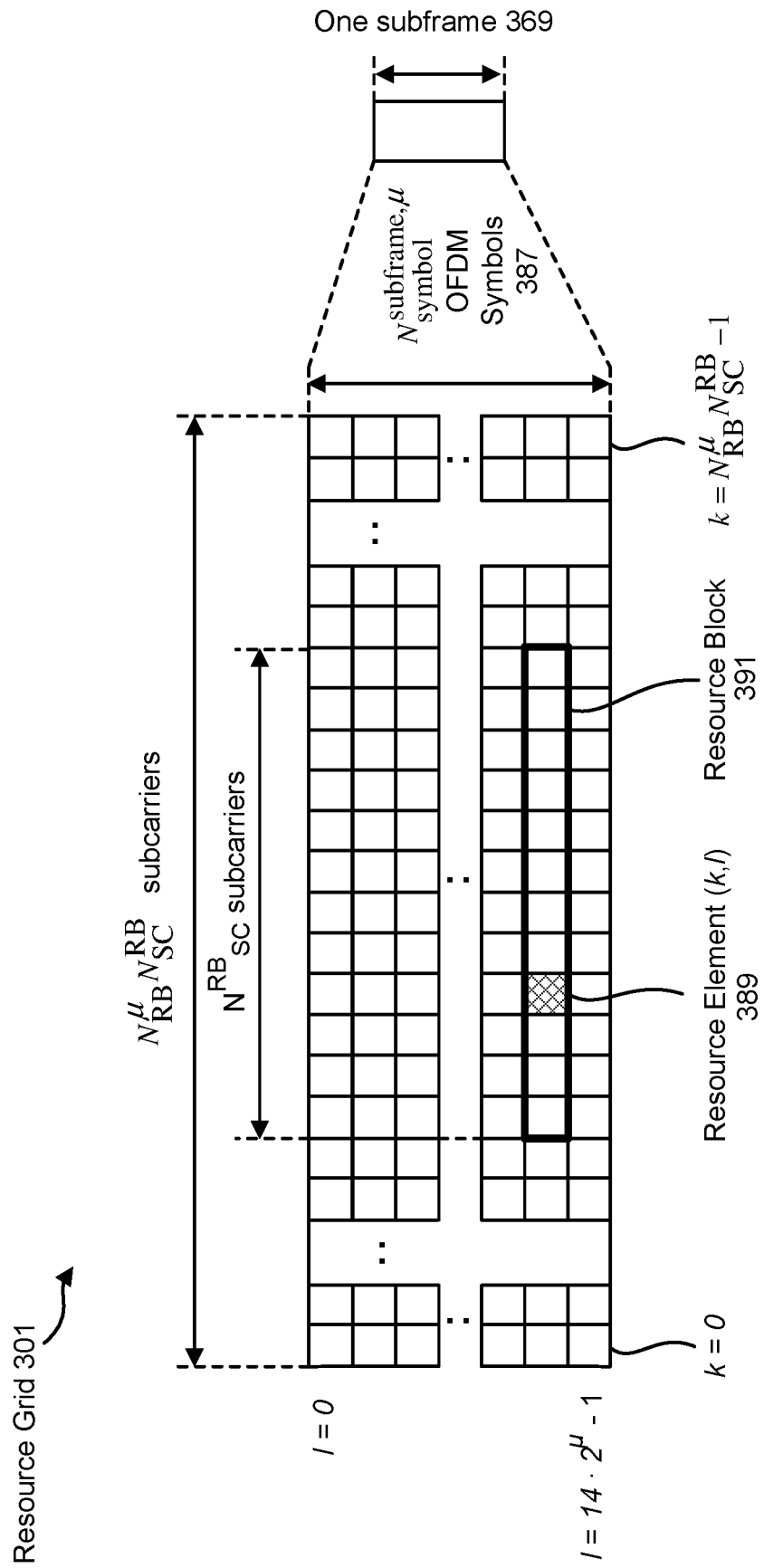
FIG. 3 is a diagram illustrating one example of a resource grid and resource block.

FIG. 3 is a diagram illustrating one example of a resource grid 301 and resource block 391 (e.g., for the downlink and/or the uplink). The resource grid 301 and resource block 391 illustrated in FIG. 3 may be utilized in some implementations of the systems and methods disclosed herein.

In FIG. 3, one subframe 369 may include $N_{symbol}^{subframe,\mu}$ symbols 387. Additionally or alternatively, a resource block 391 may include a number of resource elements (RE) 389. Here, in the downlink, the OFDM access scheme with cyclic prefix (CP) may be employed, which may be also referred to as CP-OFDM. A downlink radio frame may include multiple pairs of downlink resource blocks (RBs) 391 which are also referred to as physical resource blocks (PRBs). The downlink RB pair is a unit for assigning downlink radio resources, defined by a predetermined bandwidth (RB bandwidth) and a time slot. The downlink RB pair may include two downlink RBs 391 that are continuous in the time domain. Additionally or alternatively, the downlink RB 391 may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 389 and is uniquely identified by the index pair (k,l), where k and l are indices in the frequency and time domains, respectively.

Additionally or alternatively, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks 391. The uplink RB pair is a unit for assigning uplink radio resources, defined by a predetermined bandwidth (RB bandwidth) and a time slot. The uplink RB pair may include two uplink RBs 391 that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) 389 and is uniquely identified by the index pair (k,l) in a slot, where k and l are indices in the frequency and time domains respectively.

Each element in the resource grid 301 (e.g., antenna port p) and the subcarrier configuration μ is called a resource element 389 and is uniquely identified by the index pair (k,l) where k=0, . . . , $N_{RB}^{\mu}N_{SC}^{RB}-1$ is the in the frequency domain and l refers to the symbol position in the time domain. The resource element (k,l) 389 on the antenna port p and the subcarrier spacing configuration μ is denoted $(k,l)_{p,\mu}$. The physical resource block 391 is defined as $N_{SC}^{RB}=12$ consecutive subcarriers in the frequency main. The physical resource blocks 391 are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
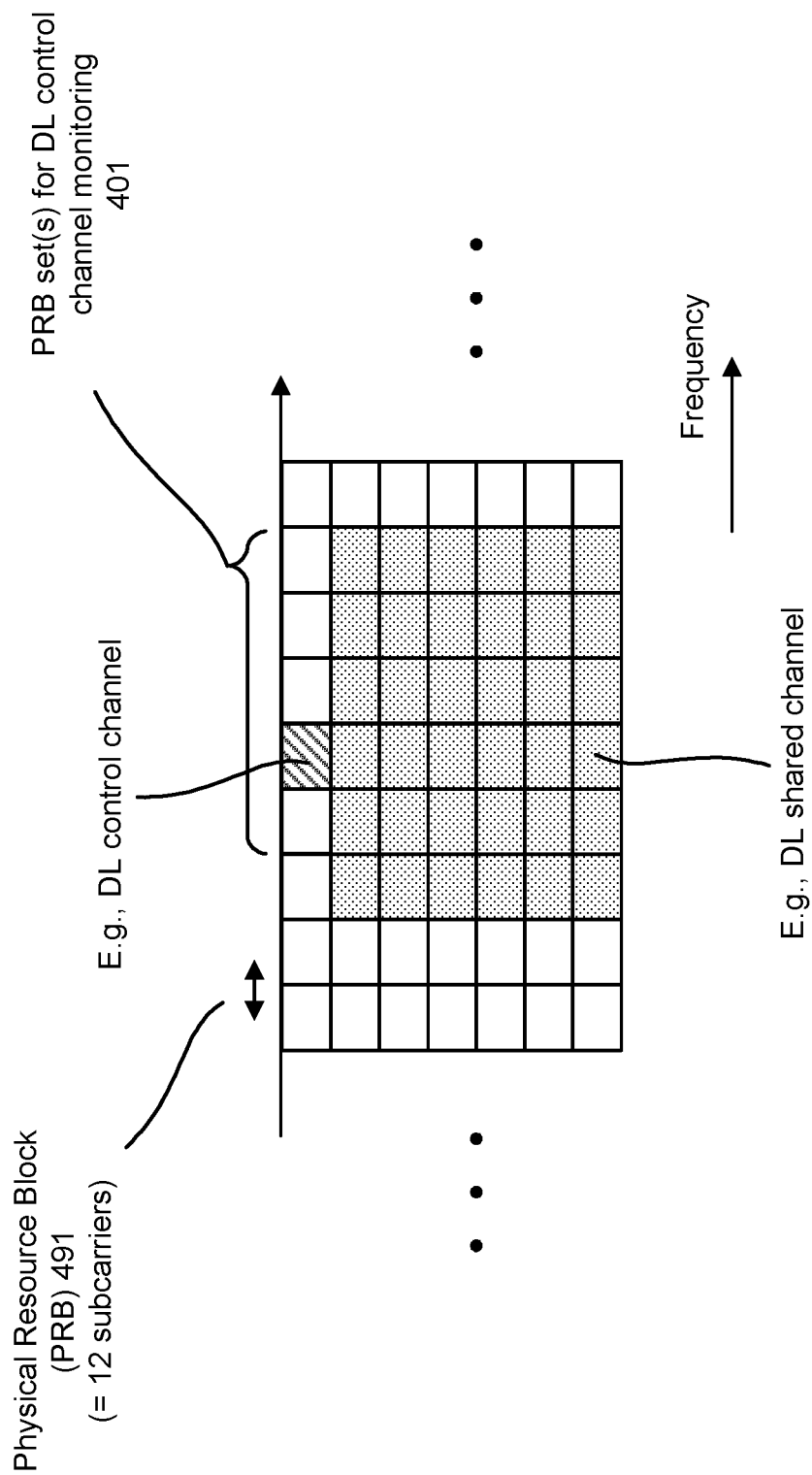
FIG. 4 shows examples of resource regions.

FIG. 4 shows examples of resource regions (e.g., resource region of the downlink). One or more sets 401 of PRB(s) 491 (e.g., a control resource set (e.g., CORESET)) may be configured for DL control channel monitoring (e.g., the PDCCH monitoring). For example, the control resource set (e.g., the CORESET) is, in the frequency domain and/or the time domain, a set 401 of PRBs 491 within which the UE 102 attempts to decode the DCI (e.g., the DCI format(s), the PDCCH(s)), where the PRBs 491 may or may not be frequency contiguous and/or time contiguous, a UE 102 may be configured with one or more control resource sets (e.g., the CORESETs) and one DCI message may be mapped within one control resource set. In the frequency-domain, a PRB 491 is the resource unit size (which may or may not include DM-RS) for the DL control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

The UE 102 may monitor a set of candidate(s) of the DL control channel(s) (e.g., PDCCH) in one or more control resource sets (e.g., the CORESET(s)) on the active DL BWP on each activated serving cell according to corresponding search space sets. Here, the candidate(s) of the DL control channel(s) may be candidates for which the DL control channel(s) may possibly be mapped, assigned, and/or transmitted. For example, a candidate of the DL control channel(s) is composed of one or more control channel elements (CCEs). Here, the term "monitor" may imply that the UE 102 attempts to decode each DL control channel(s) (e.g., the PDCCH(s), the PDCCH candidate(s)) according to the monitored DCI format(s).

The set of candidate(s) of the DL control channel(s) (e.g., the PDCCH(s), the CORESET(s) of the PDCCH(s)) for the UE 102 to monitor may be defined in terms of a search space set(s) (e.g., a search space(s), PDCCH search space(s)). For example, the search space(s) is a set of resource(s) (e.g., CORESET(s)) that may possibly be used for transmission of the PDCCH(s). The UE 102 may monitor the set of PDCCH candidate(s) according to the search space(s). The search space set(s) may comprise a common search space(s)

(CSS(s), UE-common search space(s)) and/or a user equipment-specific search space(s) (USS, UE-specific search space(s)).

Here, the CSS and/or the USS are defined (or set, configured) in a region(s) of DL control channel(s) (e.g., the DL control channel monitoring regions, CORESET). For example, the CSS may be used for transmission of DCI to a plurality of the UEs 102. That is, the CSS may be defined by a resource common to a plurality of the UEs 102. For example, a Type0-PDCCH common search space may be defined for the DCI format(s) with CRC scrambled by the SI-RNTI. Additionally or alternatively, a Type1-PDCCH common search space may be defined for the DCI format(s) with CRC scrambled by the RA-RNTI, the Temporary C-RNTI, and/or the C-RNTI. Additionally or alternatively, a Type2-PDCCH common search space may be defined for the DCI format(s) with CRC scrambled by the P-RNTI. Additionally or alternatively, a Type3-PDCCH common search space may be defined for the DCI format(s) with CRC scrambled by the C-RNTI, the CS-RNTI, and/or the first RNTI. Additionally or alternatively, the gNB 160 may transmit, in the CSS, DCI format(s) intended for a plurality of the UEs 102 and/or DCI format(s) intended for a specific UE 102.

The USS may be used for transmission of DCI to a specific UE 102. That is, the USS is defined by a resource dedicated to a certain UE 102. The USS may be defined independently for each UE 102. For example, the USS may be composed of CCEs having numbers that are determined based on a Radio Network Temporary Identifier (RNTI) (e.g., the C-RNTI, the CS-RNTI, and/or the first RNTI), a slot number in a radio frame, an aggregation level, and/or the like. For example, each of the USSs corresponding to each of the RNTI(s) described below may be defined. For instance, the USS may be defined for the DCI format(s) with CRC scrambled by the C-RNTI, the CS-RNTI, and/or the first RNTI. Additionally or alternatively, the gNB 160 may transmit, in the USS, DCI format(s) intended for a specific UE 102.

Here, the gNB 160 may transmit, by using the RRC message, first information used for configuring (e.g., determining) one or more CORESETs (e.g., an identity of the CORESET). Additionally or alternatively, for each of the one or more CORESETs, the search space sets (e.g., the sets of the CSS(s) and/or the USS) may mapped. For example, each search space (e.g., each search space set) is associated with one CORESET. Here, the first information may be configured per serving cell. For instance, the first information may be configured for each of the primary cell(s) and the secondary cell(s). Additionally or alternatively, the first information may be configured per DL BWP. For example, the first information may be configured for each of the DL BWPs in the serving cell.

Additionally or alternatively, the gNB 160 may transmit, by using the RRC message, second information used for configuring the search space set (e.g., the search space). Here, the search space set may include one or more search space. For example, one or more parameters may be configured for each search space set. For example, the second information may include information used for configuring an identity of the search space set. Additionally or alternatively, the second information may include information used for configuring an identity of the CORESET associated with the search space set. Additionally or alternatively, the second information may include information used for indicating a PDCCH monitoring periodicity and/or a PDCCH monitoring offset where the UE 102 monitors the PDCCH in the search space set. Additionally or alternatively, the second information may include information used for indicating a PDCCH monitoring pattern within a slot. For example, the information used for indicating the PDCCH monitoring pattern may be used for indicating first symbol(s) of the CORESET(s) within a slot for the PDCCH monitoring. For instance, the UE 102 may determine a PDCCH monitoring occasion(s) based on the PDCCH monitoring periodicity, the PDCCH monitoring offset, and/or the PDCCH monitoring pattern within a slot.

Additionally or alternatively, the second information may include information used for indicating a number of PDCCH candidates (e.g., a maximum number of PDCCH candidates) per CCE aggregation level. For example, 1, 2, 4, 8, 16, 32, and 64 may be defined for the CCE aggregation level(s) for the PDCCH monitoring. Additionally or alternatively, the number of PDCCH candidates (e.g., a maximum number of PDCCH candidates) may be defined per CCE aggregation level. For example, the CCE aggregation level(s) and the number of PDCCH candidates (e.g., a maximum number of PDCCH candidates) per CCE aggregation level for the CSS may be defined. Additionally or alternatively, the CCE aggregation level(s) and the number of PDCCH candidates (e.g., a maximum number of PDCCH candidates) per CCE aggregation level for the USS may be defined.

Additionally or alternatively, the second information may include information used for indicating a type of the search space set (e.g., information used for indicating that the search space set is corresponding to the CSS and/or the USS, information used for indicating that the search space set is either the CSS or the USS). Additionally or alternatively, the second information may include information used for indicating one or more DCI format(s) which accordingly the UE 102 monitors the PDCCH (e.g., the PDCCH candidates) in the search space set. For example, the gNB 160 may transmit, by using the RRC message, the second information used for indicating the one or more DCI format(s) to monitor the PDCCH (e.g., the PDCCH candidates). For example, if the search space set is the CSS (e.g., if the search space set is configured as the CSS), the DCI format 0_0 and the DCI format 1_0 may be configured to monitor the PDCCH (e.g., the PDCCH candidates). Additionally or alternatively, if the search space set is the CSS, the DCI format E and the DCI format F may be configured to monitor the PDCCH (e.g., the PDCCH candidates). Additionally or alternatively, if the search space set is the CSS, either of the DCI format 0_0 and the DCI format 1_0, or the DCI format E and the DCI format F may be configured to monitor the PDCCH (e.g., the PDCCH candidates). For example, if the search space set is the CSS, any combination of the DCI format 0_0, the DCI format 1_0, the DCI format E and/or the DCI format F may be configured to monitor the PDCCH (e.g., the PDCCH candidates). Here, the DCI format(s) for monitoring the PDCCH (e.g., the PDCCH candidates) in the CSS may be scrambled by the C-RNTI, the CS-RNTI, the first RNTI, the RA-RNTI, the Temporary C-RNTI, the P-RNTI, and/or the SI-RNTI.

Additionally or alternatively, for example, if the search space set is the USS (e.g., if the search space set is configured as the USS), the DCI format 0_0 and the DCI format 1_0 may be configured to monitor the PDCCH (e.g., the PDCCH candidates). Additionally or alternatively, if the search space set is the USS, the DCI format 0_1 and the DCI format 1_1 may be configured to monitor the PDCCH (e.g., the PDCCH candidates). For example, if the search space set is the USS, either of the DCI format 0_0 and the DCI format 1_0, or the DCI format 0_1 and the DCI format 1_1 may be configured to monitor the PDCCH (e.g., the PDCCH candidates). Additionally or alternatively, if the search space set is the USS, the DCI format E and the DCI format F may be configured to monitor the PDCCH (e.g., the PDCCH candidates). For example, if the search space set is the USS, either of the DCI format 0_0 and the DCI format 1_0, or the DCI format E and the DCI format F may be configured to monitor the PDCCH (e.g., the PDCCH candidates). Additionally or alternatively, if the search space set is the USS, either of the DCI format 0_1 and the DCI format 1_1, or the DCI format E and the DCI format F may be configured to monitor the PDCCH (e.g., the PDCCH candidates). For example, if the search space set is the USS, any combination of the DCI format 0_0, the DCI format 1_0, the DCI format 0_1, the DCI format 1_1, the DCI format E, and/or the DCI format F may be configured to monitor the PDCCH (e.g., the PDCCH candidates). Here, the DCI format(s) for monitoring the PDCCH (e.g., the PDCCH candidates) in the USS may be scrambled by the C-RNTI, the CS-RNTI, and/or the first RNTI.

Additionally or alternatively, the second information may include information used for indicating one or more RNTI(s) which accordingly the UE 102 monitors the PDCCH (e.g., the PDCCH candidates) in the search space set. For example, the gNB 160 may transmit, by using the RRC message, the second information used for indicating the one or more RNTI(s) to monitor the PDCCH (e.g., the PDCCH candidates). For instance, if the search space set is the CSS, any combination(s) of the C-RNTI, the CS-RNTI, the first RNTI, the RA-RNTI, the Temporary C-RNTI, the P-RNTI, and/or the SI-RNTI may be configured to monitor the PDCCH (e.g., the PDCCH candidates). For example, if the search space set is the CSS, either of the C-RNTI and the first RNTI, or the RA-RNTI and the Temporary C-RNTI and the P-RNTI and the SI-RNTI may be configured to monitor the PDCCH (e.g., the PDCCH candidates).

Here, the C-RNTI, the CS-RNTI, the first RNTI, the RA-RNTI, the P-RNTI, and/or the SI-RNTI may be used for scrambling of CRC attached to the DCI format 0_1. Additionally or alternatively, the C-RNTI, the CS-RNTI, the first RNTI, the RA-RNTI, the P-RNTI, and/or the SI-RNTI may be used for scrambling of CRC attached to the DCI format 1_1. Additionally or alternatively, the C-RNTI, the CS-RNTI, the first RNTI, the RA-RNTI, the P-RNTI, and/or the SI-RNTI may be used for scrambling of CRC attached to the DCI format E. Additionally or alternatively, the C-RNTI, the CS-RNTI, the first RNTI, and/or the Temporary C-RNTI may be used for scrambling of CRC attached to the DCI format 0_0. Additionally or alternatively, the C-RNTI, the CS-RNTI, the first RNTI and/or the Temporary C-RNTI may be used for scrambling of CRC attached to the DCI format 0_1. Additionally or alternatively, the C-RNTI, the CS-RNTI, the first RNTI, and/or the Temporary C-RNTI may be used for scrambling of CRC attached to the DCI format F.

Additionally or alternatively, the second information may include information used for indicating the number of bits for the DCI format(s) (e.g., a size of the DCI format(s)) which accordingly the UE 102 monitors the PDCCH (e.g., the PDCCH candidates) in the search space. For example, the gNB 160 may transmit, by using the RRC message, the second information used for indicating one or more numbers of bits of the DCI format(s) (e.g., one or more sizes of the DCI format(s)) to monitor the PDCCH (e.g., the PDCCH candidates). For example, if the search space set is the CSS, 32 bits may be configured as the number of bits for the DCI format(s). Additionally or alternatively, the UE 102 may monitor, in the search space set (e.g., the CSS), the PDCCH according to the DCI format(s) with 32 bits (e.g., the DCI format(s) having 32 bits, the size of the DCI format(s) is 32 bits). For example, the UE 102 may attempt to decode (e.g., receive), in the search space (e.g., the CSS), the DCI format(s) with 32 bits. Additionally or alternatively, for example, if the search space set is the CSS, 32 bits and 48 bits may be configured as the number of bits for the DCI format(s). Additionally or alternatively, the UE 102 may monitor, in the search space set (e.g., the CSS), the PDCCH according to the DCI format(s) with 32 bits (e.g., the DCI format(s) having 32 bits, the size of the DCI format(s) is 32 bits) and the DCI format(s) with 48 bits (e.g., the DCI format(s) having 48 bits, the size of the DCI format(s) is 48 bits). Here, the DCI format(s) with a first certain number of bits (e.g., 32 bits) may be the DCI format 0_0, the DCI format 0_1, the DCI format 1_0, the DCI format 1_1, the DCI format E, and/or the DCI format F. Additionally or alternatively, the DCI format(s) with a second certain number of bits (e.g., 48 bits) may be the DCI format 0_0, the DCI format 0_1, the DCI format 1_0, the DCI format 1_1, the DCI format E, and/or the DCI format F. For example, the number of bits for the DCI format(s) may be corresponding to the number of bits for the same and/or different types of DCI format(s).

Additionally or alternatively, for example, if the search space set is the USS, 48 bits may be configured as the number of bits for the DCI format(s). Additionally or alternatively, the UE 102 may monitor, in the search space set (e.g., the USS), the PDCCH according to the DCI format(s) with 48 bits (e.g., the DCI format(s) having 48 bits, the size of the DCI format(s) is 48 bits). For example, the UE 102 may attempt to decode (e.g., receive), in the search space (e.g., the USS), the DCI format(s) with 32 bits. Additionally or alternatively, for example, if the search space set is the USS, 48 bits and 60 bits may be configured as the number of bits for the DCI format(s). Additionally or alternatively, the UE 102 may monitor, in the search space set (e.g., the USS), the PDCCH according to the DCI format(s) with 48 bits (e.g., the DCI format(s) having 48 bits, the size of the DCI format(s) is 48 bits) and the DCI format(s) with 60 bits (e.g., the DCI format(s) having 60 bits, the size of the DCI format(s) is 60 bits). Here, the DCI format(s) with a third certain number of bits (e.g., 48 bits) may be the DCI format 0_0, the DCI format 0_1, the DCI format 1_0, the DCI format 1_1, the DCI format E, and/or the DCI format F. Additionally or alternatively, the DCI format(s) with a fourth certain number of bits (e.g., 60 bits) may be the DCI format 0_0, the DCI format 0_1, the DCI format 1_0, the DCI format 1_1, the DCI format E, and/or the DCI format F.

Here, the number of bits for the DCI format(s) may be determined based on configuration(s) by the gNB 160. For example, the gNB 160 may configure, by using the RRC message, a presence of one or more downlink control information (e.g., one or more information fields for the downlink control information) included in the DCI format(s). Additionally or alternatively, the UE 102 may determine the number of bits for the DCI format(s) based on the configuration for the presence of the one or more downlink control information included in the DCI format(s). Additionally or alternatively, for example, the gNB 160 may configure, by using the RRC message, a size of the BWP(s) (e.g., a bandwidth of the BWP(s)). Additionally or alternatively, the UE 102 may determine the number of bits for the DCI format(s) based on the size of the BWP(s). Here, the size of the BWP(s) may include the size of an initial active BWP(s), a default BWP(s), and/or an active BWP(s). For example, the number of bits for the DCI format(s) for the downlink detected in the CSS may be determined based on the size of the initial active DL BWP(s) and/or the activate DL BWP(s). Additionally or alternatively, the number of bits for the DCI format(s) for the uplink detected in the CSS may be determined based on the size of the initial activate UL BWP(s) and/or the active UL BWP(s). Additionally or alternatively, the number of bits for the DCI format(s) for the downlink detected in the USS may be determined based on the size of the active DL BWP(s). Additionally or alternatively, the number of bits for the DCI format(s) for the uplink detected in the USS may be determined based on the size of the active UL BWP(s).

For example, the UE 102 may recognize the number of bits for the DCI format(s) based on the configuration(s) (e.g., the presence of the one or more downlink control information, and/or the size of the BWP(s)). For example, based on the configuration(s), the UE 102 may recognize that the number of bits for the DCI format 0_0 is 48 bits. Additionally or alternatively, for example, based on the configuration (s), the UE 102 may recognize that the number of bits for the DCI format 1_1 is 60 bits. Additionally or alternatively, for example, based on the configuration(s), the UE 102 may recognize that the number of bits for the DCI format E and/or the DCI format F is 32 bits. Additionally or alternatively, if 60 bits is configured for the search space set, the UE 102 monitor, in the search space, the PDCCH according to the DCI format 1_1 (e.g., the DCI format 1_1 with 60 bits). Additionally or alternatively, if 48 bits and 32 bits are configured for the search space, the UE 102 may monitor, in the search space, the PDCCH according to the DCI format 0_0 (e.g., the DCI format 0_0 with 48 bits), and the DCI format E and/or the DCI format F (e.g., the DCI format E with 32 bits and/or the DCI format F with 32 bits).

Additionally or alternatively, the second information may include information used for indicating the number of the DCI format(s) which accordingly the UE 102 monitors PDCCH (e.g., the PDCCH candidates) in the search space set. For example, the gNB 160 may transmit, by using the RRC message, the second information used for indicating the number of the DCI format(s) (e.g., a maximum number of the DCI format(s)) to monitor the PDCCH (e.g., the PDCCH candidates). For example, if the search space set is the CSS, 2 may be configured as the number of the DCI format(s). Additionally or alternatively, the UE 102 may monitor, in the search space set (e.g., the CSS), the PDCCH according to 2 types of the DCI format(s). For example, the UE 102 may monitor, in the search space (e.g., the CSS), the PDCCH according to a first type of DCI format(s) (e.g., the DCI format 0_0 and/or the DCI format 1_0) and a second type of DCI format(s) (e.g., the DCI format E and/or the DCI format F). Additionally or alternatively, for example, if the search space set is the CSS, 3 may be configured as the number of the DCI format(s). Additionally or alternatively, the UE 102 may monitor, in the search space set (e.g., the CSS), the PDCCH according to 3 types of the DCI format(s). For example, the UE 102 may monitor, in the search space (e.g., the CSS), the PDCCH according to a first type of DCI format(s) (e.g., the DCI format 0_0 and/or the DCI format 1_0) and a second type of DCI format(s) (e.g., the DCI format E and/or the DCI format F) and a third type of DCI format(s) (e.g., the DCI format 0_1 and/or the DCI format 1_1). Here, the type(s) of the DCI format(s) may be determined based on the number of bits for the DCI format(s). For example, the DCI format(s) with the same number of bits may be considered as the same type(s) of DCI format(s). Here, as described herein, the number of bits for the DCI format(s) may be determined based on the configuration(s) by the gNB 160.

Additionally or alternatively, for example, if the search space set is the USS, 3 may be configured as the number of the DCI format(s). Additionally or alternatively, the UE 102 may monitor, in the search space set (e.g., the USS), the PDCCH according to 3 types of the DCI format(s). For example, the UE 102 may monitor, in the search space (e.g., the CSS), the PDCCH according to a first type of DCI format(s) (e.g., the DCI format 0_0 and/or the DCI format 1_0) and a second type of DCI format(s) (e.g., the DCI format E and/or the DCI format F) and a third type of DCI format(s) (e.g., the DCI format 0_1 and/or the DCI format 1_1).

For example, a priority for the type(s) of the DCI format(s) may be defined (e.g., configured, specified). For example, a priority for the first type of DCI format(s) (e.g., the DCI format 0_0 and/or the DCI format 1_0) may be defined as the first priority. Additionally or alternatively, a priority for the second type of DCI format(s) (e.g., the DCI format E and/or the DCI format F) may be defined as the second priority. Additionally or alternatively, a priority for the third type of DCI format(s) (e.g., the DCI format 0_1 and/or the DCI format 1_1) may be defined as the third priority. Additionally or alternatively, if 1 is configured for the search space as the number of the DCI format(s), the UE 102 may monitor, in the search space, the PDCCH according to the DCI format(s) with the first priority (e.g., the first type of DCI format). Additionally or alternatively, if 2 is configured for the search space as the number of the DCI format(s), the UE 102 may monitor, in the search space, the PDCCH according to the DCI format(s) with the first priority (e.g., the first type of DCI format(s)) and the DCI format(s) with the second priority (e.g., the second type of DCI format(s)). Additionally or alternatively, if 3 is configured for the search space as the number of the DCI format(s), the UE 102 may monitor, in the search space, the PDCCH according to the DCI format(s) with the first priority (e.g., the first type of DCI format(s)) and the DCI format(s) with the second priority (e.g., the second type of DCI format(s)) and the DCI format(s) with the third priority (e.g., the third type of DCI format(s)).

Here, the gNB 160 may transmit, by using the RRC message, third information used for configuring the priority for the DCI format(s) (e.g., the type(s) of the DCI format(s)). Additionally or alternatively, the UE 102 may determine the priority for the DCI format(s) which accordingly the UE 102 monitors the PDCCH. Additionally or alternatively, the priority for the DCI format(s) (e.g., the type(s) of the DCI format(s)) may be defined in advance by a specification, and known information between the gNB 160 and the UE 102.

Here, the second information may be configured per serving cell. For example, the second information may be configured for each of the primary cell(s) and the secondary cell(s). Additionally or alternatively, the second information may be configured per DL BWP. For example, the second information may be configured for each of DL BWPs in the serving cell. Additionally or alternatively, the third information may be configured per serving cell. For example, the third information may be configured for each of the primary cell(s) and the secondary cell(s). Additionally or alternatively, the third information may be configured per DL BWP. For example, the third information may be configured for each of DL BWPs in the serving cell.

Here, for example, for the serving cell(s), the gNB 160 may configure, by using the RRC message, a set of four DL BWPs (e.g., at most four DL BWPs, a DL BWP set) (e.g., for receptions by the UE 102). Additionally or alternatively, the gNB 160 may configure, by using the RRC message, the initial active DL BWP(s), the default DL BWP(s), and/or the active DL BWP(s). Additionally or alternatively, the gNB 160 may indicate, by using the DCI format(s) for the downlink, the active DL BWP(s). For example, for each DL BWP in the set of DL BWPs, the gNB 160 may configure, by using the RRC message, the subcarrier spacing, the cyclic prefix, a number of contiguous PRBs 491 (e.g., a bandwidth of PRBs), and/or an index (e.g., the index of the DL BWP(s), the DL BWP ID) in the set of DL BWPs.

Additionally or alternatively, for the serving cell(s), the gNB 160 may configure, by using the RRC message, a set of four UL BWP(s) (e.g., at most four UL BWPs, a UL BWP set) (e.g., for transmissions by the UE 102). Additionally or alternatively, the gNB 160 may configure, by using the RRC message, the initial active UL BWP(s), the default UL BWP(s), and/or the active UL BWP(s). Additionally or alternatively, the gNB 160 may indicate, by using the DCI format(s) for the uplink, the active UL BWP(s). Additionally or alternatively, for each UL BWP in the set of UL BWPs, the gNB 160 may configure, by using the RRC message, the subcarrier spacing, the cyclic prefix, a number of contiguous PRBs 491 (e.g., a bandwidth of PRBs), an index (e.g., the index of the UL BWP(s), the UL BWP ID) in the set of UL BWPs.

Additionally or alternatively, the UE 102 may perform, based on the configuration(s) for the DL BWP(s), reception(s) on the PDCCH in the DL BWP(s) and/or reception(s) on the PDSCH in the DL BWP(s). For example, the UE 102 may perform, based on the configured subcarrier spacing and cyclic prefix (e.g., the cyclic prefix length) for the DL BWP(s), the reception(s) on the PDCCH in the DL BWP(s) and/or the reception(s) on the PDSCH in the DL BWP(s). Additionally or alternatively, the UE 102 may perform, based on the configuration(s) for the UL BWP(s), transmission(s) on the PUCCH in the UL BWP(s) and/or transmission(s) on the PUSCH in the UL BWP(s). For example, the UE 102 may perform, based on the configured subcarrier spacing and cyclic prefix (e.g., the cyclic prefix length) for the UL BWP(s), the transmission(s) on the PUCCH in the UL BWP(s) and/or the transmission(s) on the PUSCH in the UL BWP(s).

Figure 5:
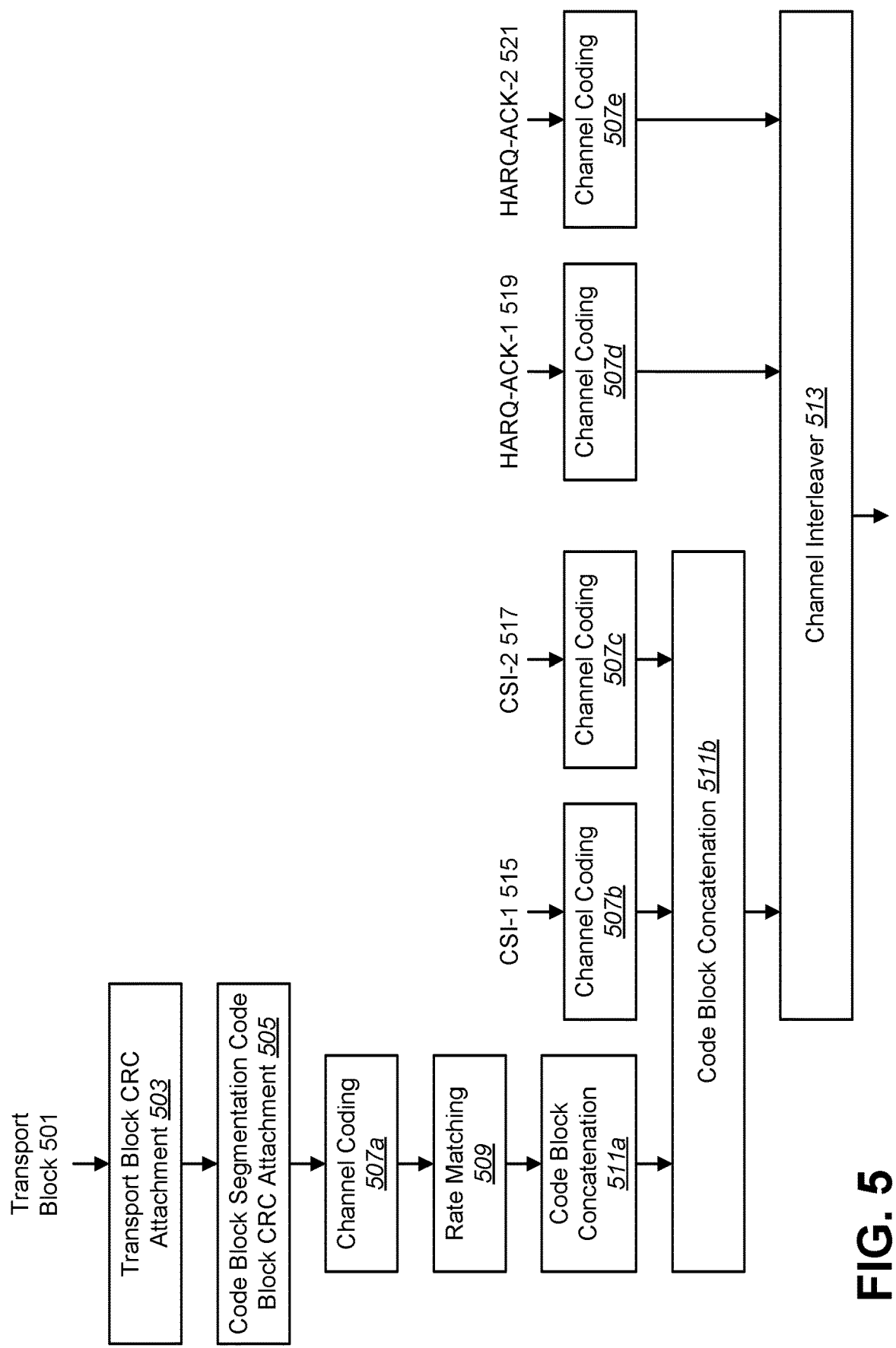
FIG. 5 illustrates an example of uplink transmissions.

FIG. 5 illustrates an example of uplink transmissions. As shown by FIG. 5, the processing (e.g., the processing structure) for the UL-SCH transport channel on one UL cell may be performed. Here, the UL-SCH (e.g., the uplink data) may be mapped to the PUSCH (e.g., the PUSCH resource, resource element(s) of the PUSCH). Additionally or alternatively, the HARQ-ACK may be mapped to the PUSCH (e.g., the PUSCH resource, resource element(s) of the PUSCH). Additionally or alternatively, the CSI may be mapped to the PUSCH (e.g., the PUSCH resource, resource element(s) of the PUSCH). Here, the CSI may include aperiodic CSI report(s) information, semi-persistent CSI report(s) information, and/or periodic CSI report(s) information. Additionally or alternatively, the CSI may include CSI part 1, CSI part 2, CQI (e.g., Channel Quality information), PMI (e.g., Precoding Matrix Information), and/or RI (e.g., Rank Indication).

For example, if the UE 102 would have on a serving cell the PUSCH transmission without the UL-SCH that overlaps with the PUSCH transmission on the serving cell that includes the HARQ-ACK(s) and/or positive SR information, the UE 120 may not perform the PUSCH transmission. Additionally or alternatively, if the UE 102 would have on a serving cell the PUSCH transmission without the UL-SCH that overlaps with the PUSCH transmission on the serving cell that includes CSI reports (e.g., semi-persistent CSI reports), the UE 102 may not perform the PUSCH with the CSI reports (e.g., the semi-persistent CSI reports). If the UE 102 has (e.g., would have) the PUSCH transmission with the UL-SCH that overlaps with the PUCCH transmission that includes HARQ-ACK(s), or semi-persistent CSI information, or periodic CSI information, the UE 102 may multiplex the HARQ-ACK(s), or the semi-persistent CSI information, or periodic CSI information in the PUSCH.

For example, in a case that the PUSCH transmission overlaps with the PUCCH transmission that includes HARQ-ACK (e.g., and/or CSI) in the same timing (e.g., in the same slot and/or in the symbol), the UE 102 may multiplex the UL-SCH (e.g., the uplink data) and the HARQ-ACK(s) (e.g., and/or the CSI) in the PUSCH. For example, the UE 102 may transmit, in the same timing (e.g., in the same slot and/or in the same symbol), the UL-SCH together with the HARQ-ACK(s) (e.g., and/or the CSI) on the PUSCH.

Here, the HARQ-ACK(s) may include one or more HARQ-ACKs. For example, the HARQ-ACK(s) may include one or more HARQ-ACKs for one or more PDSCHs (e.g., PDSCH transmissions). For example, HARQ-ACK-1 519 for one or more PDSCHs and HARQ-ACK-2 521 for one or more PDSCHs may be transmitted on the single PUSCH resource (e.g., mapped to the single same PUSCH resource). Additionally or alternatively, the HARQ-ACK-1 519 and the HARQ-ACK-2 521 may be independently (e.g., respectively) coded, and mapped to the PUSCH resource. For example, the number of resources (e.g., the number of coded symbols, the number of coded modulation symbol(s)) for the HARQ-ACK-1 519 may be dynamically changed in the PUSCH (e.g., the PUSCH resource). Additionally or alternatively, the number of resources (e.g., the number of coded symbols, the number of coded modulation symbol(s)) for the HARQ-ACK-2 521 may be dynamically changed in the PUSCH (e.g., the PUSCH resource). Additionally or alternatively, the number of resources for the HARQ-ACK-1 519 and the number of resources for the HARQ-ACK-2 521 may be respectively changed in the PUSCH (e.g., the PUSCH resource). For example, the number of resources for the HARQ-ACK-1 519 and the number of resources for the HARQ-ACK-2 521 may be respectively changed based on the configuration(s) (e.g., the RRC configuration) and/or the indication (e.g., the DCI indication).

Additionally or alternatively, the CSI(s) may include one or more CSIs. For example, the CSI(s) may include one or more CSIs for one or more PDSCHs (e.g., PDSCH transmissions). For example, CSI-1 515 for one or more PDSCHs and CSI-2 517 for one or more PDSCHs may be transmitted on the single PUSCH resource (e.g., mapped to the single PUSCH resource (e.g., mapped to the single same PUSCH resource). Additionally or alternatively, the CSI-1 515 and the CSI-2 517 may be independently (e.g., respectively) coded, and mapped to the PUSCH resource. For example, the number of resources (e.g., the number of coded symbols, the number of coded modulation symbol(s)) for the CSI-1 515 may be dynamically changed in the PUSCH (e.g., the PUSCH resource). Additionally or alternatively, the number of resources (e.g., the number of coded symbols, the number of coded modulation symbols) for the CSI-2 517 may be dynamically changed in the PUSCH (e.g., the PUSCH resource). Additionally or alternatively, the number of resources for the CSI-1 515 and the number of resources for the CSI-2 517 may be respectively changed in the PUSCH (e.g., the PUSCH resource). For example, the number of resources for the CSI-1 515 and the number of resources for the CSI-2 517 may be respectively changed based on the configuration(s) (e.g., the RRC configuration) and/or the indication (e.g., the DCI indication).

One or more of the following descriptions may be referred to for FIG. 5. For an uplink shared channel, FIG. 5 shows the processing structure for the UL-SCH transport channel on one UL cell. Data arrives to the coding unit in the form of a maximum of two transport blocks every transmission time interval (TTI) per UL cell. The following coding steps can be identified for each transport block 501 of an UL cell:

Add 503 CRC to the transport block 501;
Code block segmentation and code block CRC attachment 505;
Channel coding 507a-e of data and control information;
Rate matching 509;
Code block concatenation 511a-b;
Multiplexing of data and control information;
Channel interleaver 513.

An example of transport block CRC attachment is described as follows. Error detection is provided on each UL-SCH transport block through a Cyclic Redundancy Check (CRC). The entire transport block is used to calculate the CRC parity bits. Denote the bits in a transport block delivered to layer 1 by $a_0, a_1, a_2, a_3, \ldots, a_{A-1}$, and the parity bits by $p_0, p_1, p_2, p_3, \ldots, p_{L-1}$. A is the size of the transport block and L is the number of parity bits. The lowest order information bit $a_0$ is mapped to the most significant bit of the transport block. The parity bits are computed and attached to the UL-SCH transport block.

An example of code block segmentation and code block CRC attachment is described as follows. The bits input to the code block segmentation are denoted by $b_0, b_1, b_2, b_3, \ldots, b_{B-1}$ where B is the number of bits in the transport block (including CRC). Additionally or alternatively, code block segmentation and code block CRC attachment are performed. The bits after code block segmentation are denoted by $c_{r0}, c_{r1}, c_{r2}, c_{r3}, \ldots, c_{r(K_r-1)}$, where r is the code block number and $K_r$ is the number of bits for code block number r.

An example of channel coding of UL-SCH is given as follows. Code blocks are delivered to the channel coding block. The bits in a code block are denoted by $c_{r0}, c_{r1}, c_{r2}, c_{r3}, \ldots, c_{r(K_r-1)}$, where r is the code block number, and $K_r$ is the number of bits in code block number r. The total number of code blocks is denoted by C and each code block is individually encoded. After encoding the bits are denoted by $d_{r0}^{(i)}, d_{r1}^{(i)}, d_{r2}^{(i)}, d_{r3}^{(i)}, \ldots d_{r(D_r-1)}^{(i)}$, with i=0, 1, and 2 and where $D_r$ is the number of bits on the i-th coded stream for code block number r, e.g., $D_r = K_r + 4$.

An example of rate matching is given as follows. Coded blocks are delivered to the rate matching block. They are denoted by $d_{r0}^{(i)}, d_{r1}^{(i)}, d_{r2}^{(i)}, d_{r3}^{(i)}, \ldots d_{r(D_r-1)}^{(i)}$, with i=0, 1, and 2, and where r is the code block number, i is the coded stream index, and $D_r$ is the number of bits in each coded stream of code block number r. The total number of code blocks is denoted by C and each coded block is individually rate matched. After rate matching, the bits are denoted by $e_{r0}, e_{r1}, e_{r2}, e_{r3}, \ldots, e_{r(E_r-1)}$, where r is the coded block number, and where $E_r$ is the number of rate matched bits for code block number r.

An example of code block concatenation is given as follows. The bits input to the code block concatenation block are denoted by $e_{r0}, e_{r1}, e_{r2}, e_{r3}, \ldots, e_{r(E_r-1)}$ for r=0, ..., C−1 and where $E_r$ is the number of rate matched bits for the r-th code block. Additionally or alternatively, code block concatenation is performed. The bits after code block concatenation are denoted by $f_0, f_1, f_2, f_3, \ldots, f_{G-1}$, where G is the total number of coded bits for transmission of the given transport block over $N_L$ transmission layers excluding the bits used for control transmission, when control information is multiplexed with the UL-SCH transmission.

An example of channel coding of control information is given as follows. Control data arrives at the coding unit in the form of CSI (e.g., CSI-1 515, and/or CSI-2 517), HARQ-ACK (HARQ-ACK-1 519, and/or HARQ-ACK-2 521). Different coding rates for the UCI (e.g., CSI-1 515, CSI-2 517, HARQ-ACK-1 519, HARQ-ACK-2 521, respectively) are achieved by allocating different number of resources (e.g., different number of resources for multiplexing each of UCIs in the PUSCH). For example, in a case that UCI are transmitted in the PUSCH, the channel coding(s) for HARQ-ACK-1, HARQ-ACK-2, CSI-1 515, and/or CSI-2 517 is performed independently.

For example, in a case that the UE transmits HARQ-ACK bits (e.g., HARQ-ACK-1 519 and/or HARQ-2), it may be determine the number of resources (e.g., the number of coded symbols, the number of coded modulation symbols for HARQ-ACK (e.g., HARQ-ACK-1 519 and/or HARQ-ACK-2 521, respectively) as follows.

$$Q' = \min\left(\left\lceil \frac{O \cdot M_{SC}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{SC}^{PUSCH}\right) \quad (1)$$

In Equation (1):

O is the number of HARQ-ACK bits (e.g., HARQ-ACK-1 bits and/or HARQ-ACK-2 521 bits, respectively);

$M_{sc}^{PUSCH}$ is the scheduled bandwidth for PUSCH transmission in the current timing (e.g., in a slot and/or in a symbol) for the transport block, expressed as the number of subcarriers and/or the subcarrier spacing;

$N_{symb}^{PUSCH-initial}$ is the number of SC-FDMA symbols per slot for initial PUSCH transmission;

$M_{sc}^{PUSCH-initial}$, C, and $K_r$ are obtained from the initial PDCCH. For example, $M_{sc}^{PUSCH-initial}$ may be given by the frequency resource allocation field (e.g., DCI) included in the DCI format(s) for the uplink;

for HARQ-ACK(s)transmission, $\beta_{offset}^{PUSCH} = \beta_{offset}^{HARQ-ACK}$ (e.g., an offset value for HARQ-ACK) as described herein.

Additionally or alternatively, for CSI (e.g., CSI-1 515 and/or CSI-2 517, respectively), in a case that the UE transmits CSI bits (e.g., CSI-1 bits and/or CSI-2 bits, respectively), it may be determine the number of resources (e.g., the number of coded symbols, the number of coded modulation symbols for CSI as follows.

$$Q' = \min\left(\left\lceil \frac{(O+L) \cdot M_{SC}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, M_{SC}^{PUSCH} \cdot N_{symb}^{PUSCH} - \frac{Q_{RI}^{(x)}}{Q_m^{(x)}}\right) \quad (2)$$

In Equation (2):
O is the number of CQI/PMI bits;
L is the number of CRC bits given by $$L = \begin{cases} 0 & O \le 11 \\ 8 & \text{otherwise} \end{cases};$$

$M_{sc}^{PUSCH}$ is the scheduled bandwidth for PUSCH transmission in the current timing (e.g., in a slot and/or in a symbol) for the transport block, expressed as the number of subcarriers and/or the subcarrier spacing;

$Q_{CQI}=Q_m^{(x)} \cdot Q'$. $Q_m$ may be a modulation scheme indicated by using the DCI format for the uplink;

$M_{sc}^{PUSCH\text{-}initial(x)}$, $C^{(x)}$, and $K_r^{(x)}$ are obtained from the initial PDCCH. For example, $M_{sc}^{PUSCH\text{-}initial(x)}$, $C^{(x)}$, and $K_r^{(x)}$ may be given by the frequency resource allocation field (e.g., DCI) included in the DCI format(s) for the uplink; and $N_{symb}^{PUSCH\text{-}initial(x)}$ is the number of symbols per slot for initial PUSCH transmission.

For the CSI, $\beta_{offset}^{PUSCH}=\beta_{offset}^{CQI}$ (e.g., an offset value for the CSI) as described herein. Here, for example, $\beta_{offset}^{PUSCH}=\beta_{offset}^{CQI}$ which may be determined based on $\beta_{offset}^{CSI\text{-}1}$ and $\beta_{offset}^{CSI\text{-}2}$. Here, $\beta_{CSI\text{-}1}$ and $\beta_{offset}^{CSI\text{-}2}$ described herein may be assumed to be included the offset value(s) for the CSI in some implementations for the sake of simplifying description.

For example, the number of resources for the HARQ-ACK-1 519 and the number of resources for the HARQ-ACK-2 521 may be determined, respectively, based on Equation (1) above. Additionally or alternatively, the number of resources for the CSI-1 515 and the number of resources for the CSI-2 517 may be determined, respectively, based on Equation (2) above. For example, the HARQ-ACK-1 519 and the HARQ-ACK-2 521 may be transmitted with different reliabilities on the PUSCH (e.g., the PUSCH resource). Additionally or alternatively, CSI-1 515 and CSI-2 517 may be transmitted with different reliabilities on the PUSCH (e.g., the PUSCH resource).

FIG. 6 illustrates an example of offset values. FIG. 6 illustrates a first mapping 601 of offset value(s) for HARQ-ACK and a second mapping 603 of offset value(s) for CSI.

As described herein, the offset value(s) (e.g., the offset value(s) for the HARQ-ACK and/or the offset value(s) for the CSI) may be defined (e.g., configured, and/or indicated). Additionally or alternatively, the UE 102 may determine, based on the offset value(s) for the HARQ-ACK, the number of resource for multiplexing HARQ-ACK in the PUSCH. Additionally or alternatively, the UE 102 may determine, based on the offset value(s) for the CSI, the number of resource for multiplexing CSI in the PUSCH. Here, one or more offset values for one or more HARQ-ACKs may be defined to determine the number of resource for one or more HARQ-ACKs, respectively. For example, a first offset value(s) for the HARQ-ACK-1 and a second offset value(s) for the HARQ-ACK-2 may be defined, respectively. Additionally or alternatively, the UE 102 may transmit the HARQ-ACK-1 and the HARQ-ACK-2 together on the PUSCH (e.g., the scheduled PUSCH resources). Additionally or alternatively, one or more offset values for one or more CSIs may be defined to determine the number of resource for one or more CSIs, respectively. For example, a first offset value(s) for the CSI-1 and a second offset value(s) for the CSI-2 may be defined, respectively. Additionally or alternatively, the UE 102 may transmit the CSI-1 and the CSI-2 together on the PUSCH (e.g., the scheduled PUSCH resources).

Here, for example, the gNB 160 may transmit, by using the RRC message, fourth information used for configuring the offset value(s) for the HARQ-ACK(s). Additionally or alternatively, the gNB 160 may transmit on the PDCCH, the DCI format(s) for the downlink (e.g., the DCI format A, the DCI format B, and/or the DCI format E) including information (e.g., information field(s)) used for indicating the offset value(s) for the HARQ-ACK(s). Additionally or alternatively, the gNB 160 may transmit, by using the RRC message, fifth information used for configuring more than one offset values (e.g., four offset values) for the HARQ-ACK. Additionally or alternatively, the gNB 160 may transmit on the PDCCH, the DCI format(s) for the downlink including information used for indicating one offset value among from the more than one values for the HARQ-ACK configured by using the fifth information.

Additionally or alternatively, as described herein, the UE 102 may transmit on the PUSCH, the one or more HARQ-ACKs (e.g., HARQ-ACK-1 and HARQ-ACK-2) for the one or more PDSCHs (e.g., the PDSCH transmission). Here, the number of resources for each of the HARQ-ACKs may be determined based on each of the offset values. For example, the offset values may be configured for each of HARQ-ACKs (e.g., each of HARQ-ACK-1 and HARQ-ACK-2). For example, the gNB 160 may transmit, by using the RRC message, sixth information used for configuring a correspondence(s) (e.g., an association(s), and/or a linkage(s), a linking(s)) of the offset value(s) and the HARQ-ACKs (e.g., each of HARQ-ACK-1 and HARQ-ACK-2). Here, the sixth information may include information used for configuring a correspondence(s) of the offset value(s) and the PDCCHs (e.g., the search space set(s), the CORESET(s), the aggregation level(s), the RNTI(s), and/or the DCI format(s) (e.g., for the downlink (e.g., the DCI format A, the DCI format B, and/or the DCI format E), and/or for the uplink (e.g., the DCI format C, the DCI format D, and/or the DCI format F))). Additionally or alternatively, the sixth information may include information used for configuring a correspondence(s) of the offset value(s) for the HARQ-ACK(s) and the PDSCH(s) (e.g., the PDSCH transmission(s)). Here, the correspondence(s) of the offset value(s) and the HARQ-ACK(s) (e.g., and/or the PDCCH(s), and/or the PDSCH(s)) may be defined, in advance, by a specification, and known information between the gNB 160 and the UE 102.

For example, the sixth information may include information used for configuring a correspondence(s) of the offset value(s) and the search space set(s) (e.g., the index of search space). Here, the sixth information may be included in the second information. For example, the gNB 106 may configure, by using the RRC message, the offset value=12 for the search space set index=2. Additionally or alternatively, the gNB 106 may configure, by using the RRC message, the offset value=8 for the search space set index=3. For example, in a case that the UE 102 detects the DCI format(s) for the downlink in the search space set(s) with the index=2, the UE 102 may determine, based on the offset value=12, the number of resources for the HARQ-ACK(s) for the PDSCH(s) scheduled by using the DCI format(s) (e.g., the DCI format(s) detected in the search space set with the index=2). Additionally or alternatively, in a case that the UE 102 detects the DCI format(s) for the downlink in the search space set(s) with the index=3, the UE 102 may determine, based on the offset value=8, the number of resources for the HARQ-ACK(s) for the PDSCH(s) scheduled by using the DCI format(s) (e.g., the DCI format(s) detected in the search space set with the index=3).

Additionally or alternatively, the sixth information may include information used for configuring a correspondence(s) of the offset value(s) and the CORESET(s) (e.g., the index of CORESET). For example, the gNB 106 may configure, by using the RRC message, the offset value=9 for the CORESET index=3. Additionally or alternatively, the gNB 106 may configure, by using the RRC message, the offset value=12 for the CORESET index=1. For example, in a case that the UE 102 detects the DCI format(s) for the downlink in the CORESET with the index=3, the UE 102 may determine, based on the offset value=9, the number of resources for the HARQ-ACK(s) for the PDSCH(s) scheduled by using the DCI format(s) (e.g., the DCI format(s) detected in the CORESET with the index=2). Additionally or alternatively, in a case that the UE 102 detects the DCI format(s) for the downlink in the CORESET with the index=1, the UE 102 may determine, based on the offset value=12, the number of resources for the HARQ-ACK(s) for the PDSCH(s) scheduled by using the DCI format(s) (e.g., the DCI format(s) detected in the CORESET with the index=1).

Additionally or alternatively, the sixth information may include information used for configuring a correspondence(s) of the offset value(s) and the aggregation level(s). For example, the gNB 106 may configure, by using the RRC message, the offset value=6 for the aggregation level=4. Additionally or alternatively, the gNB 106 may configure, by using the RRC message, the offset value=15 for the aggregation level=16. For example, in a case that the UE 102 detects the DCI format(s) for the downlink in the PDCCH with the aggregation level=4, the UE 102 may determine, based on the offset value=6, the number of resources for the HARQ-ACK(s) for the PDSCH(s) scheduled by using the DCI format(s) (e.g., the DCI format(s) detected in the PDCCH with the aggregation level=4). Additionally or alternatively, in a case that the UE 102 detects the DCI format(s) for the downlink in the PDCCH with the aggregation level=16, the UE 102 may determine, based on the offset value=15, the number of resources for the HARQ-ACK(s) for the PDSCH(s) scheduled by using the DCI format(s) (e.g., the DCI format(s) detected in the PDCCH with the aggregation level=16).

Additionally or alternatively, the sixth information may include information used for configuring a correspondence(s) of the offset value(s) and the RNTI(s). For example, the gNB 106 may configure, by using the RRC message, the offset value=6 for a first certain RNTI (e.g., the C-RNTI and/or the CS-RNTI). Additionally or alternatively, the gNB 106 may configure, by using the RRC message, the offset value=15 for a second certain RNTI (e.g., the first RNTI). For example, in a case that the UE 102 detects the DCI format(s) with the first certain RNTI, the UE 102 may determine, based on the offset value=6, the number of resources for the HARQ-ACK(s) for the PDSCH(s) scheduled by using the DCI format(s) (e.g., the DCI format(s) with the first certain RNTI). Additionally or alternatively, in a case that the UE 102 detects the DCI format(s) with the second certain RNTI, the UE 102 may determine, based on the offset value=15, the number of resources for the HARQ-ACK(s) for the PDSCH(s) scheduled by using the DCI format(s) (e.g., the DCI format(s) with the second certain RNTI).

Additionally or alternatively, the sixth information may include information used for configuring a correspondence(s) of the offset value(s) and the DCI format(s) (e.g., the DCI format(s) for the downlink). For example, the gNB 106 may configure, by using the RRC message, the offset value=7 for the DCI format B. Additionally or alternatively, the gNB 160 may configure, by using the RRC message, the offset value=15 for the DCI format E. For example, in a case that the UE 102 detects the DCI format B, the UE 102 may determine, based on the offset value=7, the number of resources for the HARQ-ACK(s) for the PDSCH(s) scheduled by using the DCI format B. Additionally or alternatively, in a case that the UE 102 detects the DCI format E, the UE 102 may determine, based on the offset value=15, the number of resources for the HARQ-ACK(s) for the PDSCH(s) scheduled by using the DCI format E.

For example, the sixth information (e.g., and/or the offset value(s) for the HARQ-ACK) may be configured per search space set, per CORESET, per aggregation level, per RNTI, and/or per DCI format (e.g., per DCI format for the downlink, and/or per DCI format for the uplink). For example, the sixth information (e.g., and/or the offset value(s) for the HARQ-ACK) may be configured for one or more search space sets. Additionally or alternatively, the sixth information (e.g., and/or the offset value(s) for the HARQ-ACK) may be configured for one or more CORESETs. Additionally or alternatively, the sixth information (e.g., and/or the offset value(s) for the HARQ-ACK) may be configured for one or more aggregation levels. Additionally or alternatively, the sixth information (e.g., and/or the offset value(s) for the HARQ-ACK) may be configured for one or more RNTIs. Additionally or alternatively, the sixth information (e.g., and/or the offset value(s) for the HARQ-ACK) may be configured for one or more DCI formats (e.g., one or more DCI formats for the downlink, and/or one or more DCI format(s) for the uplink). Here, the sixth information (e.g., and/or the offset value(s) for the HARQ-ACK) may be configured per serving cell. For example, the sixth information (e.g., and/or the offset value(s) for the HARQ-ACK) may be configured for each of the primary cell(s) and the secondary cell(s). Additionally or alternatively, the sixth information (e.g., and/or the offset value(s) for the HARQ-ACK) may be configured per DL BWP. For example, the sixth information (e.g., and/or the offset value(s) for the HARQ-ACK) may be configured for each of the DL BWPs.

Here, the gNB 160 may transmit, by using the RMSI (e.g., SIB type 2), the offset value(s) for the HARQ-ACK. Additionally or alternatively, the gNB 160 may transmit, by using the dedicated RRC message, the offset value(s) for the HARQ-ACK. Additionally or alternatively, the UE 102 may use the offset value(s) for the HARQ-ACK configured by the RMSI and/or the offset value(s) for the HARQ-ACK configured by the dedicated RRC message to determine the number of resources for the HARQ-ACKs (e.g., the HARQ-ACK-1, and/or the HARQ-ACK-2, respectively). For example, in a case that the offset value(s) is configured by using the dedicated RRC message, the UE 102 may use the offset value(s) configured by using the dedicated RRC message. For example, even if the offset value(s) is configured by using the RMSI, in a case that the offset value(s) is configured by using the dedicated RRC message, the UE 102 may use the offset value(s) configured by using the dedicated RRC message. For example, the offset value(s) configured by using the dedicated RRC message may override the offset value(s) configured by using the RMSI. Additionally or alternatively, in a case that no offset value(s) is configured by using the dedicated RRC message (e.g., in a case that the offset value(s) is not configured by using the dedicated RRC message), the UE 102 may use the offset value(s) configured by using the RMSI. Here, in a case that no offset value is configured by using the dedicated RRC message and no offset value is configured by using the RMSI (e.g., the offset value(s) is not configured by using the RMSI), the UE 102 use a predetermined offset value(s) (e.g., a default value(s)) to determine the number of resources for the HARQ-ACK. For example, the predetermined offset value(s) may be defined, in advance, by a specification, and known information between the gNB 160 and the UE 102. Here, in a case that the UE 102 detects the DCI format(s) (e.g., the DCI format(s) for the downlink and/or the DCI format(s) for the uplink, and/or the PDCCH) in the USS, the UE 102 uses the offset value(s) configured by using the RMSI and/or the offset value(s) configured by using the dedicated RRC message to determine the number of resources for the HARQ-ACK (e.g., the HARQ-ACK-1, and/or the HARQ-ACK, respectively), as described herein.

For example, in a case that UE 102 detects the DCI format(s) (e.g., the DCI format(s) for the downlink and/or the DCI format(s) for the uplink, and/or the PDCCH) in the CSS, the UE 102 always uses the offset value(s) configured by using the RMSI. Additionally or alternatively, in a case that UE 102 detects the DCI format(s) (e.g., the DCI format(s) for the downlink and/or the DCI format(s) for the uplink, and/or the PDCCH) in a predetermined CORESET(s) (e.g., the CORESET(s) with index 0 (e.g., the index of the CORESET=0)), the UE 102 always uses the offset value(s) configured by using the RMSI. Additionally or alternatively, in a case that UE 102 detects the DCI format(s) (e.g., the DCI format(s) for the downlink and/or the DCI format(s) for the uplink, and/or the PDCCH) in a predetermined search space set(s) (e.g., the search space set(s) with index 0 (e.g., the index of the search space set=0)), the UE 102 always uses the offset value(s) configured by using the RMSI. Additionally or alternatively, in a case that UE 102 detects the DCI format 0_0 and/or the DCI format 1_0, the UE 102 always uses the offset value(s) configured by using the RMSI. Here, the predetermined CORESET(s) and/or the predetermined search space may be defined, in advance, by a specification, and known information between the gNB 160 and the UE 102.

Additionally or alternatively, as described herein, the information used for indicating the offset value(s) may be included in the DCI format(s) (e.g., the DCI format(s) for the downlink and/or the DCI format(s) for the uplink). For example, the gNB 160 may indicate, by using the DCI format(s) for the downlink, the offset value=12 for the PDSCH-1 (e.g., the PDSCH-1 transmission, the HARQ-ACK-1 transmission for the PDSCH-1). For example, the PDSCH-1 may be scheduled by using the DCI format(s) including the information used for indicating the offset value=12. Additionally or alternatively, the UE 102 may determine, based on the offset value=12, the number of resources for the HARQ-ACK-1 for the PDSCH-1 transmission (e.g., the PDSCH-1 transmission scheduled by using the DCI format(s) indicates the offset value=12). Additionally or alternatively, the gNB 160 may indicate, by using the DCI format(s) for the downlink, the offset value=8 for the PDSCH-2 (e.g., the PDSCH-2 transmission, the HARQ-ACK-2 transmission for the PDSCH-2). For example, the PDSCH-2 may be scheduled by using the DCI format(s) including the information used for indicating the offset value=8. Additionally or alternatively, the UE 102 may determine, based on the offset value=8, the number of resources for the HARQ-ACK-2 for the PDSCH-2 transmission (e.g., the PDSCH-2 transmission scheduled by using the DCI format(s) indicates the offset value=12). Here, as described herein, the gNB 160 may indicate one offset value among from the more than one offset values (e.g., the four offset values) configured by using the RRC message. For example, the offset value=12 may be the one offset value among from the more than one offset values configured by using the RRC message. Additionally or alternatively, the offset value=8 may be the one offset value among from the more than one offset values configured by using the RRC message.

Additionally or alternatively, for example, the gNB 160 may indicate, (e.g., by using the DCI format(s) for the uplink), the offset value=12 for the PDSCH-1 (e.g., the PDSCH-1 transmission, the HARQ-ACK-1 transmission for the PDSCH-1) and the offset value=8 for the PDSCH-2 (e.g., the PDSCH-2 transmission, the HARQ-ACK-2 transmission for the PDSCH-2). For example, one or more information fields may be defined (e.g., in the DCI format(s) for the uplink) for the information used for indicating the offset value(s) for the HARQ-ACK(s) (e.g., the HARQ-ACK-1, and/or the HARQ-ACK-2, respectively). Additionally or alternatively, for example, each of the one or more information fields may be used for indicating each of the offset values for the HARQ-ACKs (e.g., the HARQ-ACK-1, and/ or the HARQ-ACK-2, respectively). For example, the offset value1=12 may be set to a first information field(s) for the information used for indicating the offset value(s), and the offset value2=8 may be set to a second information field(s) for the information used for indicating the offset value(s). Alternatively, for example, one single value set to one information filed may be used for indicating each of the offset values for the HARQ-ACKs. For example, the one single value set to one information field may be used for indicating the offset value=12 and the offset value=8. For example, the gNB 160 may transmit, by using the RRC message, seventh information used for configuring more than one sets of the offset value(s) (e.g., four sets of the offset value(s)) for the HARQ-ACK(s). Additionally or alternatively, the gNB 160 may transmit on the PDCCH, the DCI format(s) for the uplink including information used for indicating one set of the offset value(s) among from the more than one sets of the offset value(s) for the HARQ-ACK configured by using the seventh information.

For example, the gNB 160 may configure, by using the RRC message, four sets of the offset value(s) (e.g., "00": 1st set of the offset value(s) (the offset value1=12, the offset valu2=8), "01": 2nd set of the offset value(s) (the offset value1=10, the offset valu2=7), "10": 3rd set of the offset value(s) (the offset value1=6, the offset valu2=14), "11": 4th set of the offset value(s) (the offset value1=10, the offset valu2=12)). Additionally or alternatively, in a case that the information used for indicating the offset value is set to "01", 2nd set of the offset value(s) (the offset value1=10, the offset valu2=7) may be used for determining the number of resources for the HARQ-ACK(s). For example, the offset value1=10 may be used for determining the number of resources for the HARQ-ACK-1 for the PDSCH-1 transmission (e.g., the PDSCH-1 transmission scheduled by using the PDCCH-1 (e.g., and/or the DCI format(s) for the downlink)). Additionally or alternatively, the offset value1=7 may be used for determining the number of resources for the HARQ-ACK-2 for the PDSCH-2 transmission (e.g., the PDSCH-2 transmission scheduled by using the PDCCH-2 (e.g., and/or the DCI format(s) for the downlink)).

For example, a correspondence of the offset value(s) indicated by the DCI format(s) for the uplink and the HARQ-ACK(s) (e.g., and/or the PDCCH (e.g., the search space set(s), the CORESET(s), the aggregation level(s), the RNTI(s), the DCI format(s) (e.g., for the downlink, and/or for the uplink)), and/or the PDSCH) may be defined (e.g., configured and/or indicated). For example, the offset value1 indicated by using the DCI format(s) for the uplink may be corresponding to the HARQ-ACK-1 transmission(s) for the PDSCH-1. Additionally or alternatively, the offset value2 indicated by using the DCI format(s) for the uplink may be corresponding to the HARQ-ACK-2 transmission(s) for the PDSCH-2. For example, the gNB 160 may transmit, by using the RRC message, eighth information used for configuring the correspondence of the offset value(s) indicated by the DCI format(s) for the uplink and the HARQ-ACK(s) (e.g., and/or the PDCCH (e.g., the search space set(s), the CORESET(s), the aggregation level(s), the RNTI(s), and/or the DCI format(s) for the downlink), and/or the PDSCH). Here, the correspondence(s) of the offset value(s) indicated by using the DCI format(s) for the uplink and the HARQ-ACK(s) (e.g., and/or the PDCCH (e.g., the search space set(s), the CORESET(s), the aggregation level(s), and/or the RNTI(s), and/or the DCI format(s) for the downlink), and/or the PDSCH) may be defined, in advance, by a specification, and known information between the gNB 160 and the UE 102.

For example, the eighth information may include information used for configuring a correspondence(s) of the offset value(s) (e.g., indicated by using the DCI format(s) for the uplink) and the search space set(s) (e.g., the index of search space). Here, the eighth information may be included in the second information. For example, the gNB 106 may configure, by using the RRC message, the offset value1 (e.g., the offset value1=12 indicated by using the DCI format(s) for the uplink) for the search space set index=2. Additionally or alternatively, the gNB 106 may configure, by using the RRC message, the offset value2 (e.g., the offset value2=8 indicated by using the DCI format(s) for the uplink) for the search space set index=3. For example, in a case that the UE 102 detects the DCI format(s) for the downlink in the search space set(s) with the index=2 and the PUSCH is scheduled by using the DCI format(s) for the uplink (e.g., including the information used for indicating the offset value(s) (e.g., the offset value1=12 and the offset value2=8)), the UE 102 may determine, based on the offset value=12, the number of resources for the HARQ-ACK(s) for the PDSCH(s) scheduled by using the DCI format(s) (e.g., the DCI format(s) detected in the search space set with the index=2). Additionally or alternatively, in a case that the UE 102 detects the DCI format(s) for the downlink in the search space set(s) with the index=3 and the PUSCH is scheduled by using the DCI format(s) for the uplink (e.g., including the information used for indicating the offset value(s) (e.g., the offset value1=12 and the offset value2=8)), the UE 102 may determine, based on the offset value=8, the number of resources for the HARQ-ACK(s) for the PDSCH(s) scheduled by using the DCI format(s) (e.g., the DCI format(s) detected in the search space set with the index=3).

Additionally or alternatively, the eighth information may include information used for configuring a correspondence(s) of the offset value(s) (e.g., indicated by using the DCI format(s) for the uplink) and the CORESET(s) (e.g., the index of CORESET). For example, the gNB 106 may configure, by using the RRC message, the offset value1 (e.g., the offset value1=9 indicated by using the DCI format(s) for the uplink) for the CORESET index=3. Additionally or alternatively, the gNB 106 may configure, by using the RRC message, the offset value2 (e.g., the offset value2=12 indicated by using the DCI format(s) for the uplink) for the CORESET index=1. For example, in a case that the UE 102 detects the DCI format(s) for the downlink in the CORESET with the index=3 and the PUSCH is scheduled by using the DCI format(s) for the uplink (e.g., including the information used for indicating the offset value(s) (e.g., the offset value1=9 and the offset value2=12)), the UE 102 may determine, based on the offset value=9, the number of resources for the HARQ-ACK(s) for the PDSCH(s) scheduled by using the DCI format(s) (e.g., the DCI format(s) detected in the CORESET with the index=2). Additionally or alternatively, in a case that the UE 102 detects the DCI format(s) for the downlink in the CORESET with the index=1 and the PUSCH is scheduled by using the DCI format(s) for the uplink (e.g., including the information used for indicating the offset value(s) (e.g., the offset value1=9 and the offset value2=12)), the UE 102 may determine, based on the offset value=12, the number of resources for the HARQ-ACK(s) for the PDSCH(s) scheduled by using the DCI format(s) (e.g., the DCI format(s) detected in the CORESET with the index=1).

Additionally or alternatively, the eighth information may include information used for configuring a correspondence(s) of the offset value(s) (e.g., indicated by using the DCI format(s) for the uplink) and the aggregation level(s). For example, the gNB 106 may configure, by using the RRC message, the offset value1 (e.g., the offset value1=6 indicated by using the DCI format(s) for the uplink) for the aggregation level=4. Additionally or alternatively, the gNB 106 may configure, by using the RRC message, the offset value2 (e.g., the offset value2=15 indicated by using the DCI format(s) for the uplink) for the aggregation level=16. For example, in a case that the UE 102 detects the DCI format(s) for the downlink in the PDCCH with the aggregation level=4 and the PUSCH is scheduled by using the DCI format(s) for the uplink (e.g., including the information used for indicating the offset value(s) (e.g., the offset value1=6 and the offset value2=15)), the UE 102 may determine, based on the offset value=6, the number of resources for the HARQ-ACK(s) for the PDSCH(s) scheduled by using the DCI format(s) (e.g., the DCI format(s) detected in the PDCCH with the aggregation level=4). Additionally or alternatively, in a case that the UE 102 detects the DCI format(s) for the downlink in the PDCCH with the aggregation level=16 and the PUSCH is scheduled by using the DCI format(s) for the uplink (e.g., including the information used for indicating the offset value(s) (e.g., the offset value1=6 and the offset value2=15)), the UE 102 may determine, based on the offset value=15, the number of resources for the HARQ-ACK(s) for the PDSCH(s) scheduled by using the DCI format(s) (e.g., the DCI format(s) detected in the PDCCH with the aggregation level=16).

Additionally or alternatively, the eighth information may include information used for configuring a correspondence(s) of the offset value(s) (e.g., indicated by using the DCI format(s) for the uplink) and the RNTI(s). For example, the gNB 106 may configure, by using the RRC message, the offset value1 (e.g., the offset value1=6 indicated by using the DCI format(s) for the uplink) for the first certain RNTI (e.g., the C-RNTI and/or the CS-RNTI). Additionally or alternatively, the gNB 106 may configure, by using the RRC message, the offset value2 (e.g., the offset value2=15 indicated by using the DCI format(s) for the uplink) for the second certain RNTI (e.g., the first RNTI). For example, in a case that the UE 102 detects the DCI format(s) for the downlink with the first certain RNTI and the PUSCH is scheduled by using the DCI format(s) for the uplink (e.g., including the information used for indicating the offset value(s) (e.g., the offset value1=6 and the offset value2=15)), the UE 102 may determine, based on the offset value=6, the number of resources for the HARQ-ACK(s) for the PDSCH(s) scheduled by using the DCI format(s) (e.g., the DCI format(s) with the first certain RNTI). Additionally or alternatively, in a case that the UE 102 detects the DCI format(s) for the downlink with the second certain RNTI and the PUSCH is scheduled by using the DCI format(s) for the uplink (e.g., including the information used for indicating the offset value(s) (e.g., the offset value1=6 and the offset value2=15)), the UE 102 may determine, based on the offset value=15, the number of resources for the HARQ-ACK(s) for the PDSCH(s) scheduled by using the DCI format(s) (e.g., the DCI format(s) with the second certain RNTI).

Additionally or alternatively, the eighth information may include information used for configuring a correspondence(s) of the offset value(s) (e.g., indicated by using the DCI format(s) for the uplink) and the DCI format(s) (e.g., the DCI format(s) for the downlink). For example, the gNB 106 may configure, by using the RRC message, the offset value1 (e.g., the offset value=7 indicated by using the DCI format(s) for the uplink) for the DCI format B. Additionally or alternatively, the gNB 160 may configure, by using the RRC message, the offset value2 (e.g., the offset value=15 indicated by using the DCI format(s) for the uplink) for the DCI format E. For example, in a case that the UE 102 detects the DCI format B and the PUSCH is scheduled by using the DCI format(s) for the uplink (e.g., including the information used for indicating the offset value(s) (e.g., the offset value1=7 and the offset value2=15)), the UE 102 may determine, based on the offset value=7, the number of resources for the HARQ-ACK(s) for the PDSCH(s) scheduled by using the DCI format B. Additionally or alternatively, in a case that the UE 102 detects the DCI format E and the PUSCH is scheduled by using the DCI format(s) for the uplink (e.g., including the information used for indicating the offset value(s) (e.g., the offset value1=7 and the offset value2=15)), the UE 102 may determine, based on the offset value=15, the number of resources for the HARQ-ACK(s) for the PDSCH(s) scheduled by using the DCI format E.

For example, the eighth information (e.g., and/or the offset value(s) indicated by using the DCI format(s) for the uplink) may be configured per search space set, per CORESET, per aggregation level, per RNTI and/or per DCI format (e.g., per DCI format for the downlink, and/or per DCI format for the uplink). For example, the eighth information (e.g., and/or the offset value(s) indicated by using the DCI format(s) for the uplink) may be configured for one or more search space sets. Additionally or alternatively, the eighth information (e.g., and/or the offset value(s) indicated by using the DCI format(s) for the uplink) may be configured for one or more CORESETs. Additionally or alternatively, the eighth information (e.g., and/or the offset value(s) indicated by using the DCI format(s) for the uplink) may be configured for one or more aggregation levels. Additionally or alternatively, the eighth information (e.g., and/or the offset value(s) indicated by using the DCI format(s) for the uplink) may be configured for one or more RNTIs. Additionally or alternatively, the eighth information (e.g., and/or the offset value(s) indicated by using the DCI format(s) for the uplink) may be configured for one or more DCI formats (e.g., one or more DCI formats for the downlink, and/or one or more DCI formats for the uplink). Here, the eighth information (e.g., and/or the offset value(s) indicated by using the DCI format(s) for the uplink) may be configured per serving cell. For example, the eighth information (e.g., and/or the offset value(s) indicated by using the DCI format(s) for the uplink) may be configured for each of the primary cell(s) and the secondary cell(s). Additionally or alternatively, the eighth information (e.g., and/or the offset value(s) indicated by using the DCI format(s) for the uplink) may be configured per DL BWP. For example, the eighth information (e.g., and/or the offset value(s) indicated by using the DCI format(s) for the uplink) may be configured for each of the DL BWPs.

Additionally or alternatively, the information used for indicating the correspondence of the offset value(s) (e.g., indicated by using the DCI format(s) for the uplink) and the HARQ-ACK(s) (e.g., and/or the PDSCH) may be included in the DCI format(s) (e.g., the DCI format(s) for the downlink and/or the DCI format(s) for the uplink). For example, the gNB 160 may transmit, by using the DCI format(s) for the downlink, information (e.g., "0") corresponding to the offset value1 (e.g., the offset value1=12 indicated by using the DCI format(s) for the uplink) (e.g., for the HARQ-ACK transmission(s) and/or the PDSCH transmission(s)). Additionally or alternatively, the gNB 160 may transmit, by using the DCI format(s) for the downlink, information (e.g., "1") corresponding to the offset value2 (e.g., the offset value2=8 indicated by using the DCI format(s) for the uplink) (e.g., for the HARQ-ACK transmission(s) and/or the PDSCH transmission(s)). For example, in a case that the PDSCH-1 may be scheduled by using the DCI format(s) for the downlink including the information (e.g., "0") and the PUSCH is scheduled by using the DCI format(s) for the uplink (e.g., including the information used for indicating the offset value(s) (e.g., the offset value1=12 and the offset value2=8)), the UE 102 may determine, based on the offset value1=12, the number of resources for the HARQ-ACK-1 for the PDSCH-1 transmission. Additionally or alternatively, in a case that the PDSCH-2 may be scheduled by using the DCI format(s) for the downlink including the information (e.g., "1") and the PUSCH is scheduled by using the DCI format(s) for the uplink (e.g., including the information used for indicating the offset value(s) (e.g., the offset value1=12 and the offset value2=8)), the UE 102 may determine, based on the offset value2=8, the number of resources for the HARQ-ACK-2 for the PDSCH-2 transmission. Here, as described herein, the gNB 160 may indicate one offset value (and/or one set of the offset value) among from the more than one offset values (and/or more than one set of the offset values) configured by using the RRC message. For example, the offset value=12 may be the one offset value (and/or the one set of the offset value) among from the more than one offset values (and/or the more than one set of the offset value) configured by using the RRC message.

Here, the offset value(s) for the HARQ-ACK may be configured for each of different PUCCH formats. For example, the offset value(s) for the HARQ-ACK may be configured for the UE 102 to use if the UE 102 multiplexes up to 2 HARQ-ACK bits, more than 2 and up to 11 HARQ-ACK bits, and more than 11 bits in the PUSCH, respectively. For example, the gNB 160 may configure (and/or indicate), more than one offset values for each of different PUCCH formats. For example, the gNB 160 may configure (and/or indicate), more than one offset values for each of the HARQ-ACK(s) transmissions with up to 2 HARQ-ACK bits (e.g., HARQ-ACK-1 with up to 2 bits, and HARQ-ACK-2 with up to 2 bits, respectively). Additionally or alternatively, the gNB 160 may configure (and/or indicate), more than one offset values for each of the HARQ-ACK(s) transmissions with more than 2 and up to 11

HARQ-ACK bits (e.g., HARQ-ACK-1 with more than 2 and up to 11 bits, and HARQ-ACK-2 with more than 2 and up to 11 bits, respectively). Additionally or alternatively, the gNB 160 may configure (and/or indicate), more than one offset values for each of the HARQ-ACK(s) transmissions with more than 11 HARQ-ACK bits (e.g., HARQ-ACK-1 with more than 11 bits, and HARQ-ACK-2 with more than 11 bits, respectively).

FIG. 7 illustrates another example of offset values. FIG. 7 illustrates mappings 701 of offset value(s) for HARQ-ACK and mappings 703 of offset value(s) for CSI.

As shown by FIG. 7, for example, more than one mapping of the beta offset value(s) for the HARQ-ACK may be defined to determine the number of resources for multiplexing the HARQ-ACK(s) in the PUSCH. Additionally or alternatively, more than one mapping of the beta offset value(s) for the CSI may be defined to determine the number of resources for multiplexing the HARQ-ACK(s) in the PUSCH. For example, more than one mapping (e.g., two mappings (Mapping-1 and Mapping-2)) for the beta offset value(s) for the HARQ-ACK may be defined as more than one tables (e.g., two tables (Table-1 and Table-2)). Additionally or alternatively, more than one mapping for the beta offset value(s) for the CSI may be defined as more than one tables (e.g., two tables (Table-1 and Table-2)). For example, a certain value (e.g., "2") configured (and/or indicated) by the gNB 160 may be mapped to a certain offset value (e.g., "2.500") in the Mapping-1, and the certain value (e.g., "2") configured (and/or indicated) by the gNB 160 may be mapped to another certain value (e.g., "54.000") in the Mapping-2.

Additionally or alternatively, the UE 102 may determine, based on the offset value(s) defined in the Mapping-1 and/or the Mapping-2, the number of resources for the HARQ-ACK(s) (e.g., the HARQ-ACK-1, and the HARQ-ACK-2, respectively). Additionally or alternatively, the UE 102 may determine, based on the offset value(s) defined in the Mapping-1 and the Mapping-2, the number of resources for the CSI(s) (e.g., the CSI-1, and the CSI-2, respectively). For example, the number of resources for the HARQ-ACK-1 for the PDSCH-1 may be determined, based on the offset value(s) (e.g., the offset value1) in Mapping-1 (e.g., Table-1). Additionally or alternatively, the number of resources for the HARQ-ACK-2 for the PDSCH-2 may be determined, based on the offset value(s) (e.g., the offset value2) in Mapping-2 (e.g., Table-2). For example, each of the offset values may be from each of corresponding mappings (e.g., tables), respectively. Additionally or alternatively, the UE 102 may transmit the HARQ-ACK-1 and the HARQ-ACK-2 together on the PUSCH (e.g., the scheduled PUSCH resources).

For example, the gNB 160 may transmit, by using the RRC message, ninth information used for configuring the offset value(s) in Mapping-1 (e.g., Table-1) and the offset value(s) in Mapping-2 (e.g., Table-2). Additionally or alternatively, the gNB 160 may transmit on the PDCCH, the DCI format(s) for the downlink (e.g., the DCI format A, the DCI format B, and/or the DCI format E) including information (e.g., information field(s)) used for indicating the offset value(s) in Mapping-1 (e.g., Table-1) and the offset value(s) in Mapping-2 (e.g., Table-2). Additionally or alternatively, the gNB 160 may transmit, by using the RRC message, tenth information used for configuring more than one offset values (e.g., four offset values) in Mapping-1 (e.g., Table-1) and more than one offset values (e.g., four offset values) in Mapping-2 (e.g., Table-2). Additionally or alternatively, the gNB 160 may transmit on the PDCCH, the DCI format(s) for the downlink including information used for indicating one offset value among from the more than one values in Mapping-1 (e.g., Table-1) and one offset value among from the more than one values in Mapping-2 (e.g., Table-2).

Additionally or alternatively, the gNB 160 may transmit, by using the RRC message, eleventh information used for configuring a correspondence(s) of the mapping(s) (e.g., the offset value(s) in Mapping-1 and/or Mapping-2) and the HARQ-ACKs (e.g., each of HARQ-ACK-1 and HARQ-ACK-2). Here, the eleventh information may include information used for configuring a correspondence(s) of the mapping and the PDCCH(s) (e.g., the search space set(s), the CORESET(s), the aggregation level(s), the RNTI(s), and/or the DCI format(s) (e.g., for the downlink, and/or for the uplink)). Additionally or alternatively, the eleventh information may include information used for configuring a correspondence(s) of the mapping and the PDSCH(s) (e.g., the PDSCH transmission(s)). Here, the correspondence(s) of the mapping and the HARQ-ACK(s) (e.g., and/or the PDCCH(s), and/or the PDSCH(s)) may be defined, in advance, by a specification, and known information between the gNB 160 and the UE 102.

For example, the eleventh information may include information used for configuring a correspondence(s) of the mapping(s) and the search space set(s) (e.g., the index of search space). Here, the eleventh information may be included in the second information. For example, the gNB 106 may configure, by using the RRC message, Mapping-1 (e.g., the offset value=12 in Mapping-1) for the search space set index=2. Additionally or alternatively, the gNB 106 may configure, by using the RRC message, Mapping-2 (e.g., the offset value=8 in Mapping-2) for the search space set index=3. For example, in a case that the UE 102 detects the DCI format(s) for the downlink in the search space set(s) with the index=2, the UE 102 may determine, based on the offset value=12 in Mapping-1, the number of resources for the HARQ-ACK(s) for the PDSCH(s) scheduled by using the DCI format(s) (e.g., the DCI format(s) detected in the search space set with the index=2). Additionally or alternatively, in a case that the UE 102 detects the DCI format(s) for the downlink in the search space set(s) with the index=3, the UE 102 may determine, based on the offset value=8 in Mapping-2, the number of resources for the HARQ-ACK(s) for the PDSCH(s) scheduled by using the DCI format(s) (e.g., the DCI format(s) detected in the search space set with the index=3).

Additionally or alternatively, the eleventh information may include information used for configuring a correspondence(s) of the mapping(s) and the CORESET(s) (e.g., the index of CORESET). Additionally or alternatively, the eleventh information may include information used for configuring a correspondence(s) of the mapping(s) and the aggregation level(s). Additionally or alternatively, the eleventh information may include information used for configuring a correspondence(s) of the mapping(s) and the RNTI(s). Additionally or alternatively, the eleventh information may include information used for configuring a correspondence(s) of the mapping(s) and the DCI format(s) (e.g., the DCI format(s) for the downlink, and/or the DCI format(s) for the uplink). Additionally or alternatively, similar to the explanations of the search space set(s) (additionally or alternatively, the explanations of FIG. 5), the UE 102 may switch, based on the CORESET(s), the aggregation level(s), the RNTI(s), and/or the DCI format(s), the mapping(s) (e.g., the offset value(s) in Mapping-1 and/or the offset value(s) in Mapping-2) to determine the number of resources for the HARQ-ACK(s) (e.g., the HARQ-ACK-1, and the HARQ-ACK-2, respectively).

For example, the eleventh information (e.g., and/or the mapping(s) (e.g., the offset value(s) in the mapping(s)) may be configured per search space set, per CORESET, per aggregation level, per RNTI, and/or per DCI format (e.g., per DCI format for the downlink, and/or per DCI format for the uplink). For example, the eleventh information (e.g., and/or the mapping(s) (e.g., the offset value(s) in the mapping(s)) may be configured for one or more search space sets. Additionally or alternatively, the eleventh information (e.g., and/or the mapping(s) (e.g., the offset value(s) in the mapping(s)) may be configured for one or more CORESETs. Additionally or alternatively, the eleventh information (e.g., and/or the mapping(s) (e.g., the offset value(s) in the mapping(s)) may be configured for one or more aggregation levels. Additionally or alternatively, the eleventh information (e.g., and/or the mapping(s) (e.g., the offset value(s) in the mapping(s)) may be configured for one or more RNTIs. Additionally or alternatively, the eleventh information (e.g., and/or the mapping(s) (e.g., the offset value(s) in the mapping(s)) may be configured for one or more DCI formats (e.g., one or more DCI formats for the downlink and/or one or more DCI format(s) for the uplink). Here, the eleventh information (e.g., and/or the mapping(s) (e.g., the offset value(s) in the mapping(s)) may be configured per serving cell. For example, the eleventh information (e.g., and/or the mapping(s) (e.g., the offset value(s) in the mapping(s)) may be configured for each of the primary cell(s) and the secondary cell(s). Additionally or alternatively, the eleventh information (e.g., and/or the mapping(s) (e.g., the offset value(s) in the mapping(s)) may be configured per DL BWP. For example, the eleventh information (e.g., and/or the mapping(s) (e.g., the offset value(s) in the mapping(s)) may be configured for each of the DL BWPs.

Additionally or alternatively, for example, information used for indicating the mapping(s) (the offset value(s) in the mapping(s)) may be included in the DCI format(s) (e.g., the DCI format(s) for the downlink, and/or the DCI format(s) for the uplink). For example, the gNB 160 may indicate, by using the DCI format(s) for the downlink, Mpping-1 (e.g., the offset value=12 in Mapping-1) for the PDSCH-1 (e.g., the PDSCH-1 transmission, the HARQ-ACK-1 transmission for the PDSCH-1). For example, the PDSCH-1 may be scheduled by using the DCI format(s) including the information used for indicating Mapping-1 (e.g., the offset value=12 in Mapping-1). Additionally or alternatively, the UE 102 may determine, based on the offset value=12 in Mapping-1, the number of resources for the HARQ-ACK-1 for the PDSCH-1 transmission (e.g., the PDSCH-1 transmission scheduled by using the DCI format(s) indicates Mapping-1 (e.g., the offset value=12 in Mapping-1). Additionally or alternatively, the gNB 160 may indicate, by using the DCI format(s) for the downlink, Mapping-2 (e.g., the offset value=8 in Mapping-2) for the PDSCH-2 (e.g., the PDSCH-2 transmission, the HARQ-ACK-2 transmission for the PDSCH-2). For example, the PDSCH-2 may be scheduled by using the DCI format(s) including the information used for indicating Mapping-2 (e.g., the offset value=8 in Mapping-2). Additionally or alternatively, the UE 102 may determine, based on Mapping-2 (e.g., the offset value=8 in Mapping-2), the number of resources for the HARQ-ACK-2 for the PDSCH-2 transmission (e.g., the PDSCH-2 transmission scheduled by using the DCI format(s) indicates Mapping-2 (e.g., the offset value=12). Here, as described herein, the gNB 160 may indicate one offset value among from the more than one offset values (e.g., the four offset values) in each mapping configured by using the RRC message. For example, the offset value=12 may be the one offset value among from the more than one offset values in a certain mapping(s) configured by using the RRC message. Additionally or alternatively, the offset value=8 may be the one offset value among from the more than one offset values configured by using the RRC message in a certain mapping(s).

Additionally or alternatively, for example, the gNB 160 may indicate, (e.g., by using the DCI format(s) for the uplink), Mapping-1 (e.g., the offset value=12 in Mapping-1) for the PDSCH-1 (e.g., the PDSCH-1 transmission, the HARQ-ACK-1 transmission for the PDSCH-1) and/or Mapping-2 (e.g., the offset value=8 for the PDSCH-2 (e.g., the PDSCH-1 transmission, the HARQ-ACK-1 transmission for the PDSCH-1). For example, one or more information fields may be defined (e.g., in the DCI format(s) for the uplink) for the information used for indicating the mapping(s) (e.g., the offset value(s) in each mapping) for the HARQ-ACK(s) (e.g., the HARQ-ACK-1, and/or the HARQ-ACK-2, respectively). Additionally or alternatively, for example, each of the one or more information fields may be used for indicating each of mappings (e.g., each of the offset values in each of mappings) for the HARQ-ACKs (e.g., the HARQ-ACK-1, and/or the HARQ-ACK-2, respectively). For example, Mapping-1 (e.g., the offset value1=12 in Mapping-1) may be set to a first information field(s) for the information used for indicating the mapping(s), and Mapping-2 (e.g., the offset value2=8 in Mapping-2) may be set to a second information field(s) for the information used for indicating the mapping(s). Alternatively, for example, one single value set to one information filed may be used for indicating each of mappings (e.g., each of the offset values in each of mappings) for the HARQ-ACKs. For example, the one single value set to one information field may be used for indicating Mapping-1 (e.g., the offset value=12 in Mapping-1) and Mapping-2 (e.g., the offset value=8 in Mapping-2).

Here, as described herein, the gNB 160 may transmit, by using the RRC message, the seventh information used for configuring more than one sets of the offset value(s) (e.g., four sets of the offset value(s)) for the HARQ-ACK(s). Additionally or alternatively, the gNB 160 may transmit on the PDCCH, the DCI format(s) for the uplink including information used for indicating one set of the offset value(s) among from the more than one sets of the offset value(s) for the HARQ-ACK configured by using the seventh information.

Additionally or alternatively, the gNB 160 may configure, by using the RRC message, four sets of the offset value(s) (e.g., "00": 1st set of the offset value(s) (the offset value1=12 in Mapping-1, the offset valu2=8 in Mapping-2), "01": 2nd set of the offset value(s) (the offset value1=10 in Mapping-1, the offset valu2=7 in Mapping-1), "10": 3rd set of the offset value(s) (the offset value1=6 in Mapping-2, the offset valu2=14 in Mapping-1), "11": 4th set of the offset value(s) (the offset value1=10 in Mapping-2, the offset valu2=12 in Mapping-2)). Additionally or alternatively, in a case that the information used for indicating the offset value is set to "10", 3rd set of the offset value(s) (the offset value1=6 in Mapping-2, the offset valu2=14 in Mapping-1) may be used for determining the number of resources for the HARQ-ACK(s). For example, the offset value1=6 in Mapping-2 may be used for determining the number of resources for the HARQ-ACK-1 for the PDSCH-1 transmission (e.g., the PDSCH-1 transmission scheduled by using the PDCCH-1 (e.g., and/or the DCI format(s) for the downlink)). Additionally or alternatively, the offset value1=14 in Mapping-1 may be used for determining the number of resources for the HARQ-ACK-2 for the PDSCH-2 transmission (e.g., the PDSCH-2 transmission scheduled by using the PDCCH-2 (e.g., and/or the DCI format(s) for the downlink)).

For example, a correspondence of the mapping(s) (e.g., the offset value(s) in the mapping(s) indicated by the DCI format(s) for the uplink) and the HARQ-ACK(s) (e.g., and/or the PDCCH (e.g., the search space set(s), the CORESET(s), the aggregation level(s), the RNTI(s)), and/or the DCI format(s) for the downlink), and/or the PDSCH) may be defined (e.g., configured and/or indicated). For example, Mapping-1 (e.g., the offset value1 in Mapping-1 indicated by using the DCI format(s) for the uplink) may be corresponding to the HARQ-ACK-1 transmission(s) for the PDSCH-1. Additionally or alternatively, Mapping-2 (e.g., the offset value2 in Mapping-2 indicated by using the DCI format(s) for the uplink) may be corresponding to the HARQ-ACK-2 transmission(s) for the PDSCH-2. For example, the gNB 160 may transmit, by using the RRC message, twelfth information used for configuring the correspondence of the mapping(s) (e.g., the offset value(s) in the mapping(s) indicated by the DCI format(s) for the uplink) and the HARQ-ACK(s) (e.g., and/or the PDCCH (e.g., the search space set(s), the CORESET(s), the aggregation level(s), and/or the RNTI(s), and/or the DCI format(s) for the downlink), and/or the PDSCH). Here, the correspondence(s) of the mapping(s) (e.g., the offset value(s) in the mapping(s) indicated by using the DCI format(s) for the uplink and the HARQ-ACK(s) (e.g., and/or the PDCCH (e.g., the search space set(s), the CORESET(s), the aggregation level(s), and/or the RNTI(s), and/or the DCI format(s) for the downlink), and/or the PDSCH) may be defined, in advance, by a specification, and known information between the gNB 160 and the UE 102.

For example, the twelfth information may include information used for configuring a correspondence(s) of the mapping(s) (e.g., the offset value(s) in the mapping(s) indicated by using the DCI format(s) for the uplink) and the search space set(s) (e.g., the index of search space). Here, the twelfth information may be included in the second information. For example, the gNB 106 may configure, by using the RRC message, Mapping-1 (e.g., the offset value1=12 in Mapping-1 indicated by using the DCI format(s) for the uplink) for the search space set index=2. Additionally or alternatively, the gNB 106 may configure, by using the RRC message, Mapping-2 (e.g., the offset value2=8 in Mapping-2 indicated by using the DCI format(s) for the uplink) for the search space set index=3. For example, in a case that the UE 102 detects the DCI format(s) for the downlink in the search space set(s) with the index=2 and the PUSCH is scheduled by using the DCI format(s) for the uplink (e.g., including the information used for indicating the mapping(s) (e.g., the offset value1=12 in Mapping-1 and the offset value2=8 in Mapping-2)), the UE 102 may determine, based on the offset value=12 in Mapping-1, the number of resources for the HARQ-ACK(s) for the PDSCH(s) scheduled by using the DCI format(s) (e.g., the DCI format(s) detected in the search space set with the index=2). Additionally or alternatively, in a case that the UE 102 detects the DCI format(s) for the downlink in the search space set(s) with the index=3 and the PUSCH is scheduled by using the DCI format(s) for the uplink (e.g., including the information used for indicating the mapping(s) (e.g., the offset value1=12 in Mapping-1 and the offset value2=8 in Mapping-2)), the UE 102 may determine, based on the offset value=8 in Mapping-2, the number of resources for the HARQ-ACK(s) for the PDSCH(s) scheduled by using the DCI format(s) (e.g., the DCI format(s) detected in the search space set with the index=3).

Additionally or alternatively, the twelfth information may include information used for configuring a correspondence(s) of the mapping(s) (e.g., the offset value(s) in the mapping(s) indicated by using the DCI format(s) for the uplink) and the CORESET(s) (e.g., the index of CORESET). Additionally or alternatively, the twelfth information may include information used for configuring a correspondence(s) of the mapping(s) (e.g., the offset value(s) in the mapping(s) indicated by using the DCI format(s) for the uplink) and the aggregation level(s). Additionally or alternatively, the twelfth information may include information used for configuring a correspondence(s) of the mapping(s) (e.g., the offset value(s) in the mapping(s) indicated by using the DCI format(s) for the uplink) and the RNTI(s). Additionally or alternatively, the twelfth information may include information used for configuring a correspondence(s) of the mapping(s) (e.g., the offset value(s) in the mapping(s) indicated by using the DCI format(s) for the uplink) and the DCI format(s) (e.g., the DCI format(s) for the downlink, and/or the DCI format(s) for the uplink). Additionally or alternatively, similar to the explanations of the search space set(s) (additionally or alternatively, the explanations of FIG. 5), the UE 102 may switch, based on the CORESET(s), the aggregation level(s), the RNTI(s), and/or the DCI format(s), the twelfth information may include information used for configuring a correspondence(s) of the mapping(s) (e.g., the offset value(s) in the mapping(s) indicated by using the DCI format(s) for the uplink) to determine the number of resources for the HARQ-ACK(s) (e.g., the HARQ-ACK-1, and the HARQ-ACK-2, respectively).

For example, the twelfth information (e.g., and/or the mapping(s) (e.g., the offset value(s) in the mapping(s) indicated by using the DCI format(s) for the uplink)) may be configured per search space set, per CORESET, per aggregation level, per RNTI and/or per DCI format (e.g., per DCI format for the downlink, and/or per DCI format for the uplink). For example, the twelfth information (e.g., and/or the mapping(s) (e.g., the offset value(s) in the mapping(s) indicated by using the DCI format(s) for the uplink)) may be configured for one or more search space sets. Additionally or alternatively, the twelfth information (e.g., and/or the mapping(s) (e.g., the offset value(s) in the mapping(s) indicated by using the DCI format(s) for the uplink)) may be configured for one or more CORESETs. Additionally or alternatively, the twelfth information (e.g., and/or the mapping(s) (e.g., the offset value(s) in the mapping(s) indicated by using the DCI format(s) for the uplink)) may be configured for one or more aggregation levels. Additionally or alternatively, the twelfth information (e.g., and/or the mapping(s) (e.g., the offset value(s) in the mapping(s) indicated by using the DCI format(s) for the uplink)) may be configured for one or more RNTIs. Additionally or alternatively, the twelfth information (e.g., and/or the mapping(s) (e.g., the offset value(s) in the mapping(s) indicated by using the DCI format(s) for the uplink)) may be configured for one or more DCI formats (e.g., one or more DCI formats for the downlink). Here, the twelfth information (e.g., and/or the mapping(s) (e.g., the offset value(s) in the mapping(s) indicated by using the DCI format(s) for the uplink)) may be configured per serving cell. For example, the twelfth information (e.g., and/or the mapping(s) (e.g., the offset value(s) in the mapping(s) indicated by using the DCI format(s) for the uplink)) may be configured for each of the primary cell(s) and the secondary cell(s).

Additionally or alternatively, the twelfth information (e.g., and/or the mapping(s) (e.g., the offset value(s) in the mapping(s) indicated by using the DCI format(s) for the uplink)) may be configured per DL BWP. For example, the twelfth information (e.g., and/or the mapping(s) (e.g., the offset value(s) in the mapping(s) indicated by using the DCI format(s) for the uplink)) may be configured for each of the DL BWPs.

Additionally or alternatively, the information used for indicating the correspondence of the mapping(s) (e.g., the offset value(s) in the mapping(s) indicated by using the DCI format(s) for the uplink) and the HARQ-ACK(s) (e.g., and/or the PDSCH) may be included in the DCI format(s) (e.g., the DCI format(s) for the downlink and/or the DCI format(s) for the uplink). For example, the gNB 160 may transmit, by using the DCI format(s) for the downlink, information (e.g., "0") corresponding to Mapping-1 (e.g., the offset value1=12 in Mapping-1 indicated by using the DCI format(s) for the uplink) (e.g., for the HARQ-ACK transmission(s) and/or the PDSCH transmission(s)). Additionally or alternatively, the gNB 160 may transmit, by using the DCI format(s) for the downlink, information (e.g., "1") corresponding to Mapping-2 (e.g., the offset value2=8 indicated by using the DCI format(s) for the uplink) (e.g., for the HARQ-ACK transmission(s) and/or the PDSCH transmission(s)). For example, in a case that the PDSCH-1 may be scheduled by using the DCI format(s) for the downlink including the information (e.g., "0") and the PUSCH is scheduled by using the DCI format(s) for the uplink (e.g., including the information used for indicating the offset value(s) (e.g., the offset value1=12 in Mapping-1 and the offset value2=8 in Mapping-2)), the UE 102 may determine, based on the offset value1=12, the number of resources for the HARQ-ACK-1 for the PDSCH-1 transmission. Additionally or alternatively, in a case that the PDSCH-2 may be scheduled by using the DCI format(s) for the downlink including the information (e.g., "1") and the PUSCH is scheduled by using the DCI format(s) for the uplink (e.g., including the information used for indicating the offset value(s) (e.g., the offset value1=12 in Mapping-1 and the offset value2=8 in Mapping-2)), the UE 102 may determine, based on the offset value2=8 in Mapping-2, the number of resources for the HARQ-ACK-2 for the PDSCH-2 transmission. Here, as described herein, the gNB 160 may indicate one offset value (and/or one set of the offset value) among from the more than one offset values (and/or more than one set of the offset values) in the mapping(s) configured by using the RRC message. For example, the offset value=12 may be the one offset value (and/or the one set of the offset value) among from the more than one offset values (and/or the more than one set of the offset value) in the mapping(s) configured by using the RRC message.

Figure 8:
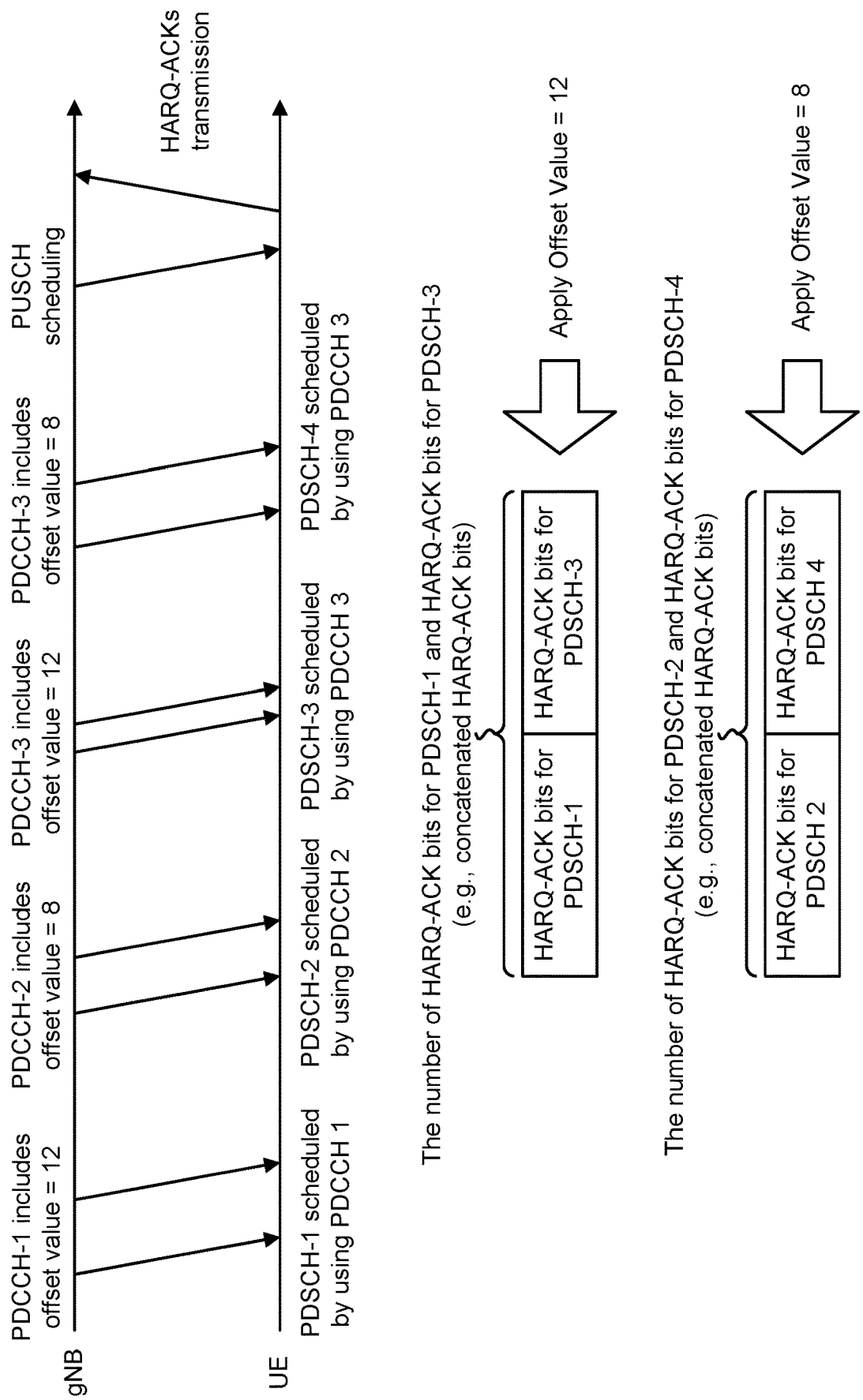
FIG. 8 illustrates an example of concatenation of hybrid automatic repeat request (HARQ-ACK) bits.

FIG. 8 illustrates an example of concatenation of HARQ-ACK bits. As described herein, for example, the offset value=12 may be used for determining the number of resources for the HARQ-ACK-1 transmission for PDSCH-1. Additionally or alternatively, the offset value=8 may be used for determining the number of resources for the HARQ-ACK-2 transmission for PDSCH-2. Additionally or alternatively, the offset value=12 may be used for determining the number of resources for the HARQ-ACK-3 transmission for PDSCH-3. Additionally or alternatively, the offset value=8 may be used for determining the number of resources for the HARQ-ACK-4 transmission for PDSCH-4. Here, as described herein, the UE 102 may transmit on the PUSCH, the HARQ-ACK-1, the HARQ-ACK-2, the HARQ-ACK-3, and/or the HARQ-ACK-4 together. For example, in a case that the PUSCH transmission overlaps with the PUCCH transmission that includes HARQ-ACK (e.g., and/or CSI) in the same timing (e.g., in the same slot and/or in the symbol), the UE 102 may multiplex the UL-SCH (e.g., the uplink data) and the HARQ-ACK(s) (e.g., and/or the CSI) in the PUSCH (e.g., the PUSCH resource).

Here, the UE 102 may concatenate the HARQ-ACK-1 bits for which the offset value=10 is configured (and/or indicated) and the HARQ-ACK-3 bits for which the offset value=10 is configured (and/or indicated). Additionally or alternatively, the UE 102 may concatenate the HARQ-ACK-2 bits for which the offset value=8 is configured (and/or indicated) and the HARQ-ACK-4 bits for which the offset value=8 is configured (and/or indicated). For example, for the HARQ-ACK transmission in an uplink timing (e.g., in an uplink slot, and/or in an uplink symbol), the HARQ-ACK bits for which the same offset value(s) is configured may be concatenated. For example, the number of HARQ-ACK bits (e.g., O in Equation 1) may be determined (e.g., calculated) based on the concatenation of the HARQ-ACK bits for which the same offset value(s) is configured. Additionally or alternatively, the UE 102 may determine, based on Equation 1, the number of resources for the HARQ-ACK multiplexing in the PUSCH (e.g., the PUSCH resources). For example, the UE 102 may determine, based on the concatenated number of HARQ-ACK bits (e.g., the concatenated HARQ-ACK bits) for which the same offset value(s) is configured, the number of resources for the HARQ-ACK. Additionally or alternatively, the UE 102 may determine, based on the offset value(s) (e.g., the same offset value(s) for HARQ-ACKs for PDSCHs), the number of resources for the HARQ-ACK.

For example, the concatenated HARQ-ACK bits (e.g., the HARQ-ACK bits for which the same offset value(s) is configured) and the offset value(s) may be used for determining the number of resources for the HARQ-ACK(s) multiplexing in the PUSCH. For example, the concatenated HARQ-ACK-A bits (e.g. the HARQ-ACK bits by the concatenation of the HARQ-ACK-1 bit and the HARQ-ACK-3 bits) and the offset value=12 may be used for determining the number of resources for the HARQ-ACK multiplexing in the PUSCH. Additionally or alternatively, the concatenated HARQ-ACK-B bits (e.g. the HARQ-ACK bits by the concatenation of the HARQ-ACK-2 bit and the HARQ-ACK-4 bits) and the offset value=8 may be used for determining the number of resources for the HARQ-ACK multiplexing in the PUSCH.

Additionally or alternatively, the HARQ-ACK-A bits may be mapped to the PUSCH resources first, and, the HARQ-ACK-B bits may be mapped to the PUSCH resources second. Alternatively, the HARQ-ACK-B bits may be mapped to the PUSCH resources first, and the HARQ-ACK-A bits may be mapped to the PUSCH resources second. For example, an order of the mapping of the HARQ-ACK-A bits and the HARQ-ACK-B bits to the PUSCH resources may be defined, in advance, by a specification, and known information between the gNB 160 and the UE 102. For example, the HARQ-ACK bits for which a higher offset value(s) (e.g., "100") is configured (and/or indicated) may be mapped to the PUSCH resources first. Additionally or alternatively, the HARQ-ACK bits for which a lower offset value(s) (e.g., "10") is configured (and/or indicated) may be mapped to the PUSCH resources second. For example, a priority for the order of the mapping of the HARQ-ACK(s) to the PUSCH resources may be determined based on a offset value(s) configured (and/or indicated).

In the description, transmission methods for HARQ-ACK are mainly explained. However, it should be noted that the above methods (and/or similar methods with the above method) may be applicable to transmission methods for CSI.

Figure 9:
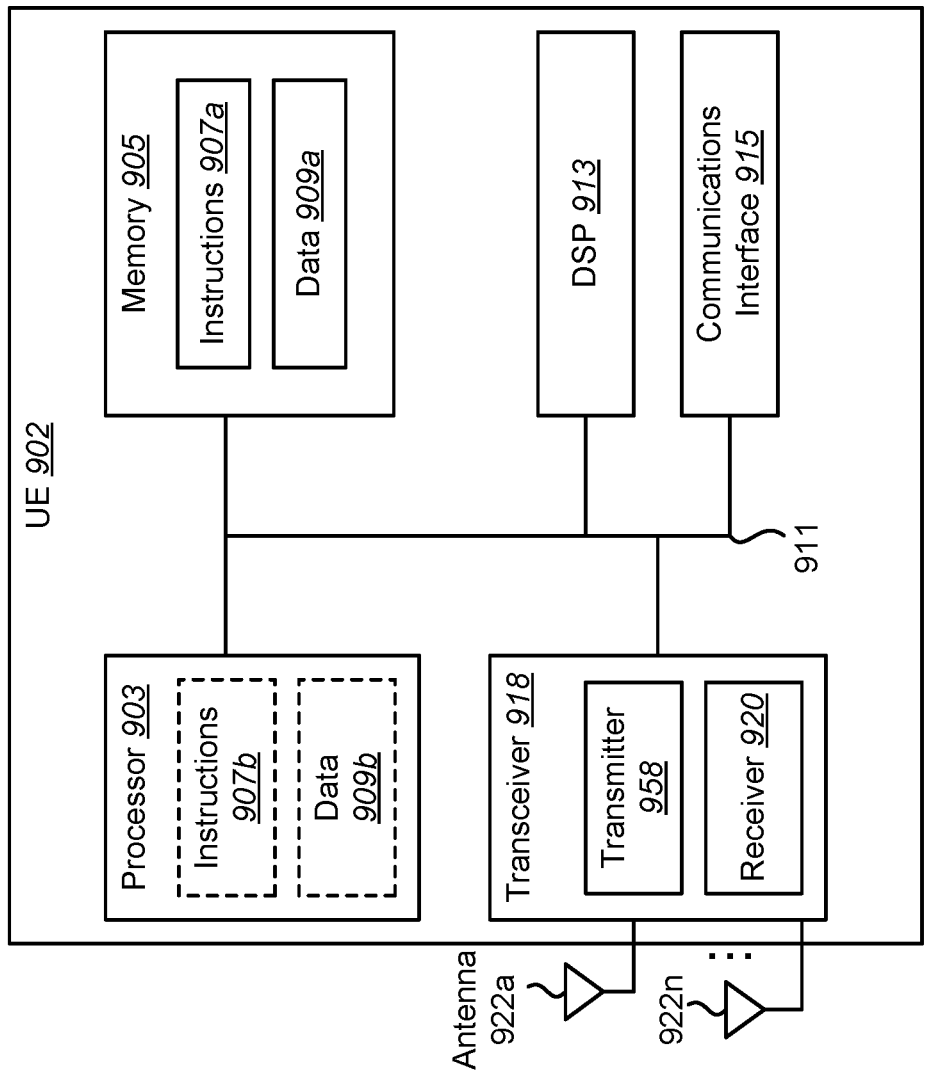
FIG. 9 illustrates various components that may be utilized in a UE.

FIG. 9 illustrates various components that may be utilized in a UE 902. The UE 902 described in connection with FIG. 9 may be implemented in accordance with the UE 102 described in connection with FIG. 1. The UE 902 includes a processor 903 that controls operation of the UE 902. The processor 903 may also be referred to as a central processing unit (CPU). Memory 905, which may include read-only memory (ROM), random access memory (RAM), a combination of the two or any type of device that may store information, provides instructions 907a and data 909a to the processor 903. A portion of the memory 905 may also include non-volatile random access memory (NVRAM). Instructions 907b and data 909b may also reside in the processor 903. Instructions 907b and/or data 909b loaded into the processor 903 may also include instructions 907a and/or data 909a from memory 905 that were loaded for execution or processing by the processor 903. The instructions 907b may be executed by the processor 903 to implement the methods described herein.

The UE 902 may also include a housing that contains one or more transmitters 958 and one or more receivers 920 to allow transmission and reception of data. The transmitter(s) 958 and receiver(s) 920 may be combined into one or more transceivers 918. One or more antennas 922a-n are attached to the housing and electrically coupled to the transceiver 918.

The various components of the UE 902 are coupled together by a bus system 911, which may include a power bus, a control signal bus and a status signal bus, in addition to a data bus. However, for the sake of clarity, the various buses are illustrated in FIG. 9 as the bus system 911. The UE 902 may also include a digital signal processor (DSP) 913 for use in processing signals. The UE 902 may also include a communications interface 915 that provides user access to the functions of the UE 902. The UE 902 illustrated in FIG. 9 is a functional block diagram rather than a listing of specific components.

Figure 10:
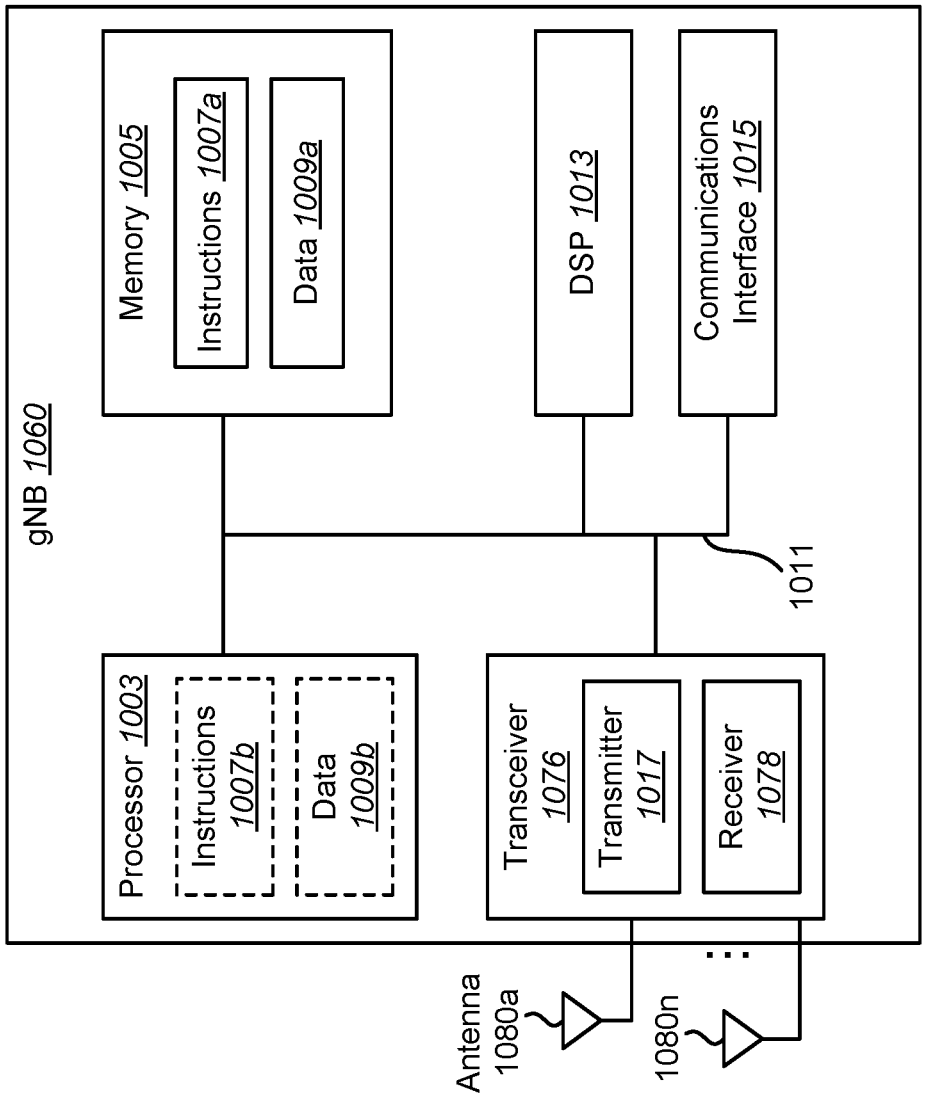
FIG. 10 illustrates various components that may be utilized in a gNB.

FIG. 10 illustrates various components that may be utilized in a gNB 1060. The gNB 1060 described in connection with FIG. 10 may be implemented in accordance with the gNB 160 described in connection with FIG. 1. The gNB 1060 includes a processor 1003 that controls operation of the gNB 1060. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described herein.

The gNB 1060 may also include a housing that contains one or more transmitters 1017 and one or more receivers 1078 to allow transmission and reception of data. The transmitter(s) 1017 and receiver(s) 1078 may be combined into one or more transceivers 1076. One or more antennas 1080a-n are attached to the housing and electrically coupled to the transceiver 1076.

The various components of the gNB 1060 are coupled together by a bus system 1011, which may include a power bus, a control signal bus and a status signal bus, in addition to a data bus. However, for the sake of clarity, the various buses are illustrated in FIG. 10 as the bus system 1011. The gNB 1060 may also include a digital signal processor (DSP) 1013 for use in processing signals. The gNB 1060 may also include a communications interface 1015 that provides user access to the functions of the gNB 1060. The gNB 1060 illustrated in FIG. 10 is a functional block diagram rather than a listing of specific components.

Figure 11:
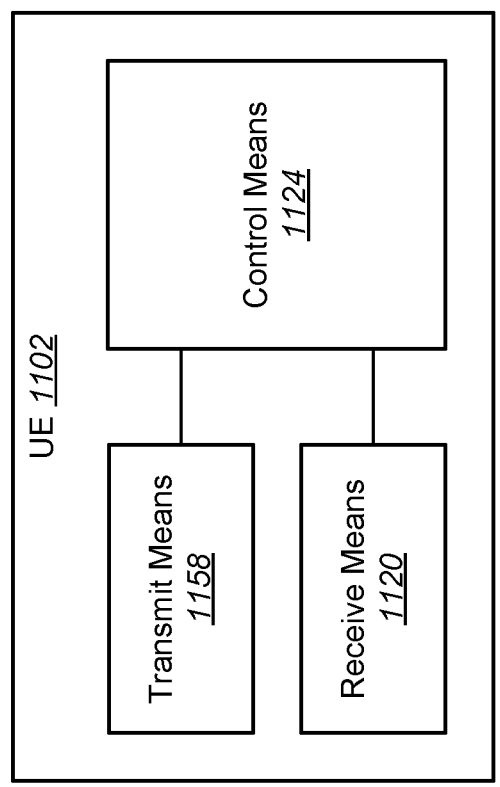
FIG. 11 is a block diagram illustrating one implementation of a UE in which one or more of the systems and/or methods described herein may be implemented.

FIG. 11 is a block diagram illustrating one implementation of a UE 1102 in which one or more of the systems and/or methods described herein may be implemented. The UE 1102 includes transmit means 1158, receive means 1120 and control means 1124. The transmit means 1158, receive means 1120 and control means 1124 may be configured to perform one or more of the functions described in connection with FIG. 1 above. FIG. 11 above illustrates one example of a concrete apparatus structure of FIG. 11. Other various structures may be implemented to realize one or more of the functions of FIG. 1. For example, a DSP may be realized by software.

Figure 12:
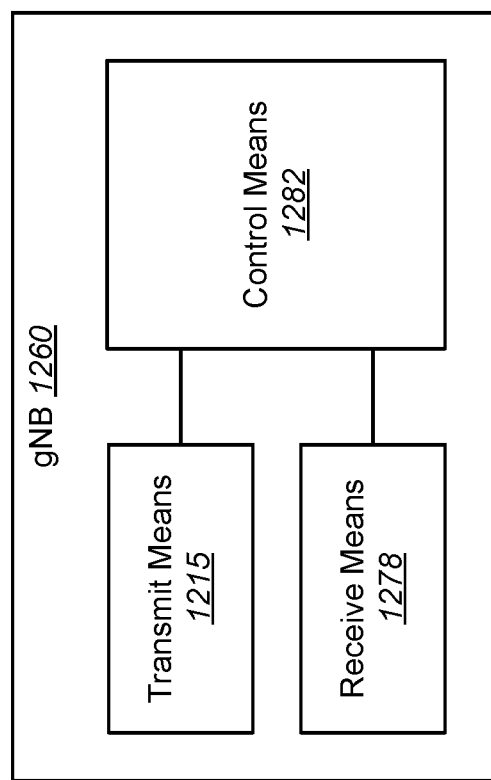
FIG. 12 is a block diagram illustrating one implementation of a gNB in which one or more of the systems and/or methods described herein may be implemented.

FIG. 12 is a block diagram illustrating one implementation of a gNB 1260 in which one or more of the systems and/or methods described herein may be implemented. The gNB 1260 includes transmit means 1217, receive means 1278 and control means 1282. The transmit means 1217, receive means 1278 and control means 1282 may be configured to perform one or more of the functions described in connection with FIG. 1 above. FIG. 12 above illustrates one example of a concrete apparatus structure of FIG. 12. Other various structures may be implemented to realize one or more of the functions of FIG. 1. For example, a DSP may be realized by software.

Figure 13:
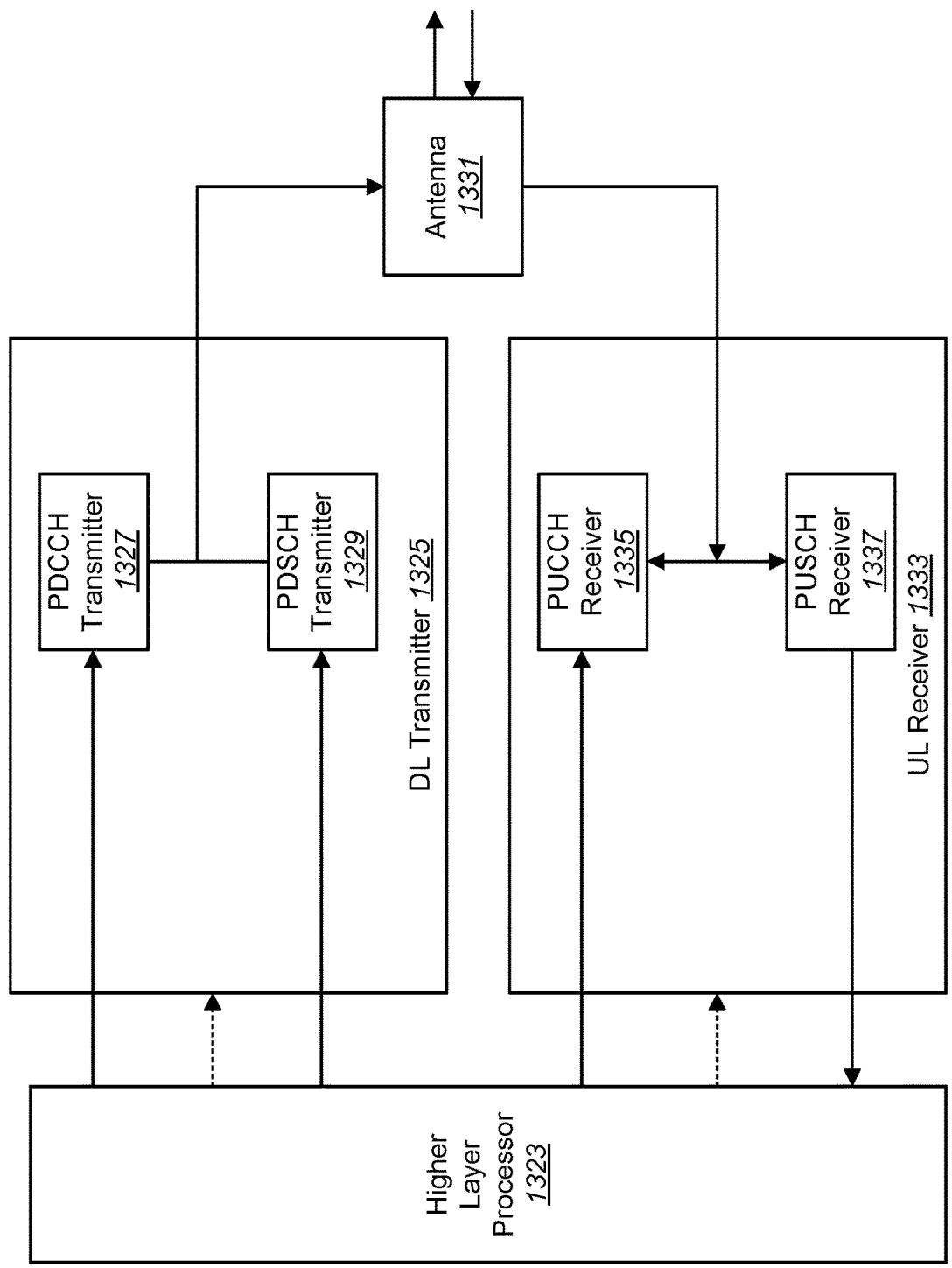
FIG. 13 is a block diagram illustrating one implementation of a gNB.

FIG. 13 is a block diagram illustrating one implementation of a gNB 1360. The gNB 1360 may be an example of the gNB 160 described in connection with FIG. 1. The gNB 1360 may include a higher layer processor 1323, a DL transmitter 1325, a UL receiver 1333, and one or more antenna 1331. The DL transmitter 1325 may include a PDCCH transmitter 1327 and a PDSCH transmitter 1329. The UL receiver 1333 may include a PUCCH receiver 1335 and a PUSCH receiver 1337.

The higher layer processor 1323 may manage physical layer's behaviors (the DL transmitter's and the UL receiver's behaviors) and provide higher layer parameters to the physical layer. The higher layer processor 1323 may obtain transport blocks from the physical layer. The higher layer processor 1323 may send/acquire higher layer messages such as an RRC message and MAC message to/from a UE's higher layer. The higher layer processor 1323 may provide the PDSCH transmitter transport blocks and provide the PDCCH transmitter transmission parameters related to the transport blocks.

The DL transmitter 1325 may multiplex downlink physical channels and downlink physical signals (including reservation signal) and transmit them via transmission antennas 1331. The UL receiver 1333 may receive multiplexed uplink physical channels and uplink physical signals via receiving antennas 1331 and de-multiplex them. The PUCCH receiver 1335 may provide the higher layer processor 1323 UCI. The PUSCH receiver 1337 may provide the higher layer processor 1323 received transport blocks.

Figure 14:
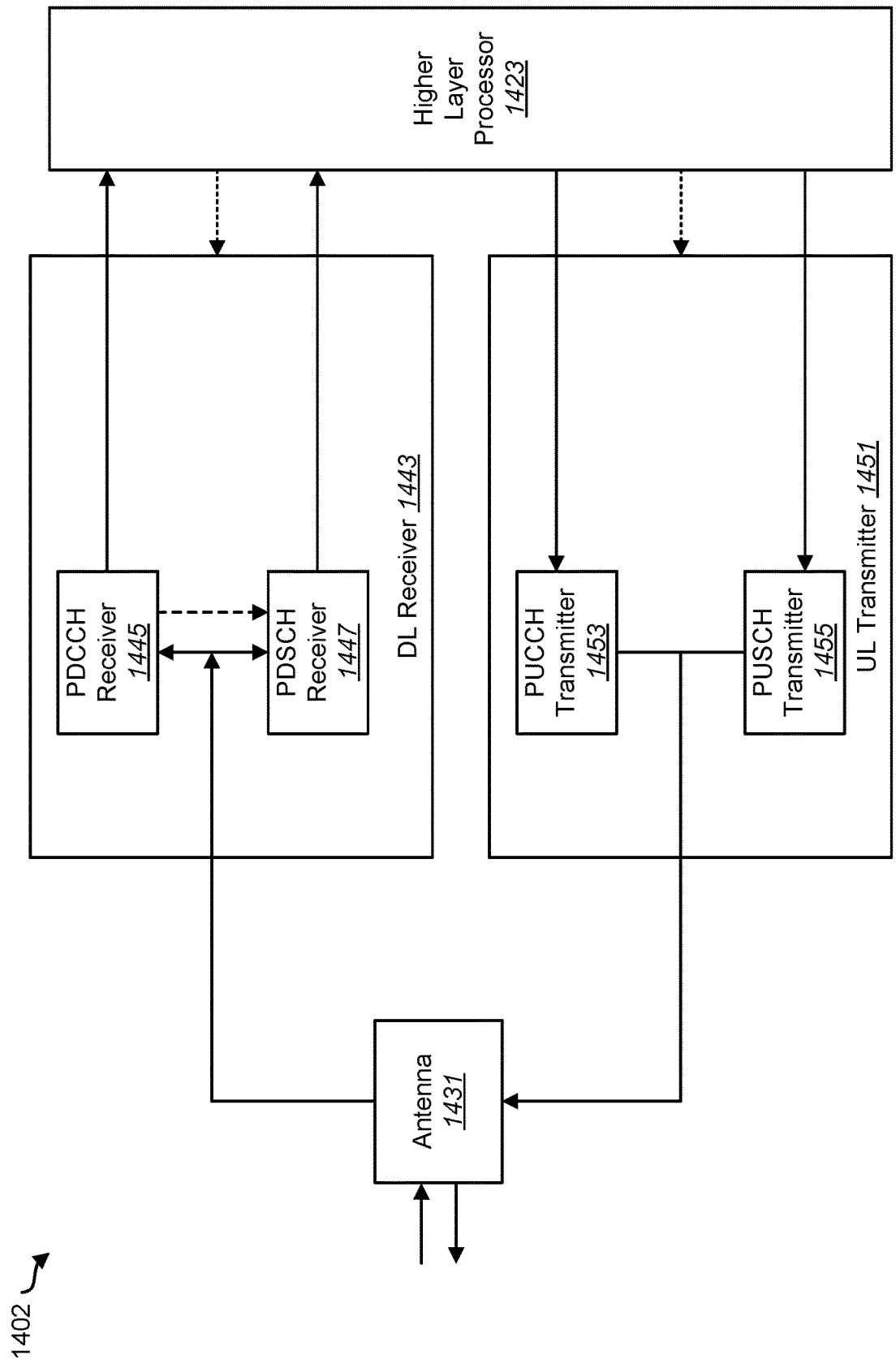
FIG. 14 is a block diagram illustrating one implementation of a UE.

FIG. 14 is a block diagram illustrating one implementation of a UE 1402. The UE 1402 may be an example of the UE 102 described in connection with FIG. 1. The UE 1402 may include a higher layer processor 1423, a UL transmitter 1451, a DL receiver 1443, and one or more antenna 1431. The UL transmitter 1451 may include a PUCCH transmitter 1453 and a PUSCH transmitter 1455. The DL receiver 1443 may include a PDCCH receiver 1445 and a PDSCH receiver 1447.

The higher layer processor 1423 may manage physical layer's behaviors (the UL transmitter's and the DL receiver's behaviors) and provide higher layer parameters to the physical layer. The higher layer processor 1423 may obtain transport blocks from the physical layer. The higher layer processor 1423 may send/acquire higher layer messages such as an RRC message and MAC message to/from a UE's higher layer. The higher layer processor 1423 may provide the PUSCH transmitter transport blocks and provide the PUCCH transmitter 1453 UCI.

The DL receiver 1443 may receive multiplexed downlink physical channels and downlink physical signals via receiving antennas 1431 and de-multiplex them. The PDCCH receiver 1445 may provide the higher layer processor 1423 DCI. The PDSCH receiver 1447 may provide the higher layer processor 1423 received transport blocks.

Figure 15:
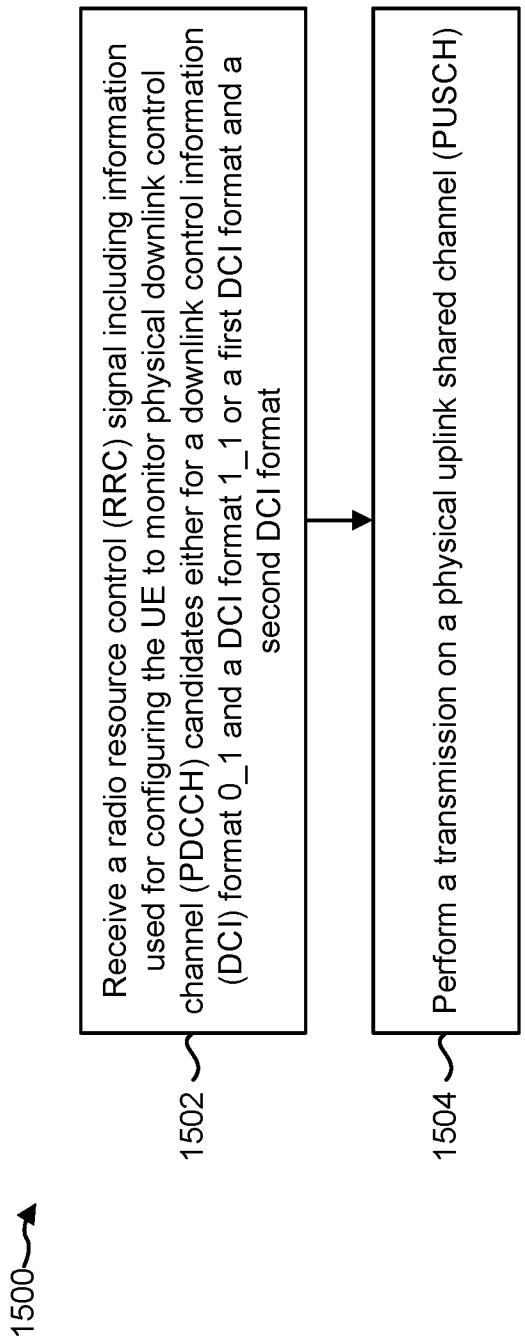
FIG. 15 is a flow diagram illustrating a communication method by a UE.

FIG. 15 is a flow diagram illustrating a communication method 1500 by a UE 102. The UE 102 may receive 1502 a radio resource control (RRC) signal including information used for configuring the UE to monitor physical downlink control channel (PDCCH) candidates either for a downlink control information (DCI) format 0_1 and a DCI format 1_1 or a first DCI format and a second DCI format. The UE 102 may perform 1504 a transmission on a physical uplink shared channel (PUSCH). In a case that the PUSCH is scheduled by using the second DCI format, a first hybrid automatic repeat request-acknowledgment (HARQ-ACK) and a second HARQ-ACK are multiplexed on the PUSCH. The number of resources for the first HARQ-ACK and the number of resources for the second HARQ-ACK are respectively determined.

The DCI format 0_1 may be used for scheduling of a PUSCH. The DCI format 1_1 may be used for scheduling of a physical downlink shared channel (PDSCH). The first DCI format may be used for scheduling of a PDSCH.

Figure 16:
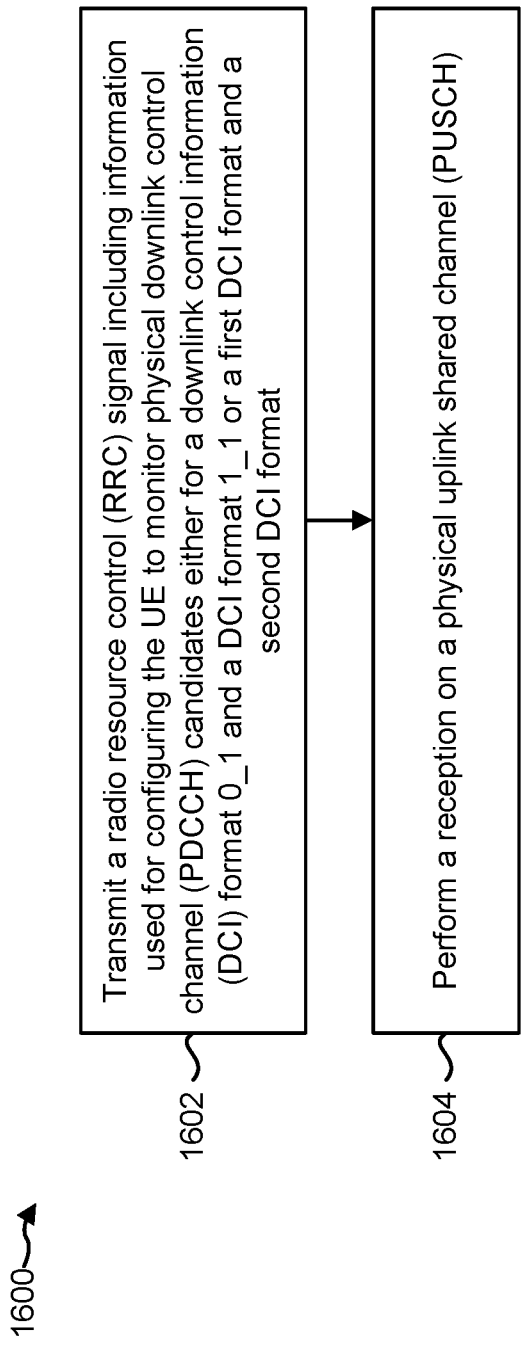
FIG. 16 is a flow diagram illustrating a communication method by a gNB.

FIG. 16 is a flow diagram illustrating a communication method 1600 by a base station apparatus (gNB) 160. The gNB 160 may transmit 1602 a radio resource control (RRC) signal including information used for configuring a user equipment (UE) to monitor physical downlink control channel (PDCCH) candidates either for a downlink control information (DCI) format 0_1 and a DCI format 1_1 or a first DCI format and a second DCI format. The gNB 160 may perform 1604 a reception of a physical uplink shared channel (PUSCH). In a case that the PUSCH is scheduled by using the second DCI format, a first hybrid automatic repeat request-acknowledgment (HARQ-ACK) and a second HARQ-ACK are multiplexed on the PUSCH. The number of resources for the first HARQ-ACK and the number of resources for the second HARQ-ACK are respectively determined.

As described herein, some methods for the DL and/or UL transmissions may be applied (e.g., specified). Here, the combination of one or more of the some methods described herein may be applied for the DL and/or UL transmission. The combination of the one or more of the some methods described herein may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described herein may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The invention claimed is:

1. A user equipment (UE) comprising:
receiving circuitry configured to receive a radio resource control (RRC) message including information for configuring one or more offset values, the receiving circuitry configured to receive a first physical downlink shared channel (PDSCH) and a second PDSCH, and the receiving circuitry configured to receive a first DCI format scheduling a first physical uplink shared channel (PUSCH) and a second DCI format scheduling a second PUSCH;
transmitting circuitry configured to transmit a first hybrid automatic repeat request (HARQ-ACK) for the first PDSCH and a second HARQ-ACK for the second PDSCH, the first HARQ-ACK and the second HARQ-ACK being multiplexed in the first PUSCH using a first number of resources and a second number of resources when a physical uplink control channel (PUCCH) for the first HARQ-ACK and the second HARQ-ACK overlaps with the first PUSCH, wherein the first number of resources for the first HARQ-ACK is determined based on a first offset value determined based on a first indication in the first DCI format and selected from a first group of offset values, and the second number of resources for the second HARQ-ACK is determined based on a second offset value determined based on the first indication in the first DCI format and selected from a second group of offset values; and
transmitting circuitry configured to transmit the first HARQ-ACK for the first PDSCH and the second HARQ-ACK for the second PDSCH, the first HARQ-ACK and the second HARQ-ACK being multiplexed in the second PUSCH using a third number of resources and a fourth number of resources when the PUCCH for the first HARQ-ACK and the second HARQ-ACK overlaps with the second PUSCH, wherein the third number of resources for the first HARQ-ACK is determined based on a third offset value determined based on a second indication in the second DCI format and selected from a third group of offset values, and the fourth number of resources for the second HARQ-ACK is determined based on a fourth offset value determined based on the second indication in the second DCI format and selected from a fourth group of offset values; wherein the RRC message includes the information for configuring an association of the one or more offset values and the first HARQ-ACK and the second HARQ-ACK, and the RRC message includes the information for configuring an association of the one or more offset values and the first DCI format and the second DCI format, the first group of offset values are associated with the first HARQ-ACK and the first DCI format, the second group of offset values are associated with the second HARQ-ACK and the first DCI format, the third group of offset values are associated with the first HARQ-ACK and the second DCI format, the fourth group of offset values are associated with the second HARQ-ACK and the second DCI format.

2. The user equipment (UE) of claim 1, further comprising:
determining the first number of resources for the first HARQ-ACK based on the first offset value selected from the first group of offset values based on the first indication in the first DCI format; and
determining the second number of resources for the second HARQ-ACK based on the second offset value selected from the second group of offset values based on a third indication in the first DCI format.

3. The user equipment (UE) of claim 1, further comprising:
determining the third number of resources for the first HARQ-ACK based on the third offset value selected from the third group of offset values based on the second indication in the second DCI format; and
determining the fourth number of resources for the second HARQ-ACK based on the fourth offset value selected from the fourth group of offset values based on a fourth indication in the second DCI format.

* * * * *